United States Patent
Moy et al.

(10) Patent No.: US 9,919,809 B2
(45) Date of Patent: *Mar. 20, 2018

(54) FOLDING WING SYSTEM

(71) Applicant: The Boeing Company, Chicago, IL (US)

(72) Inventors: George Moy, Seattle, WA (US); Charles E. Jokisch, Lynnwood, WA (US); Mark Steven Good, Seattle, WA (US); Mark John Gardner, Snohomish, WA (US); Michael Edward Renzelmann, Woodinville, WA (US); Jared Chung Houten, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 8 days.

This patent is subject to a terminal disclaimer.

(21) Appl. No.: 15/175,286

(22) Filed: Jun. 7, 2016

(65) Prior Publication Data

US 2017/0349296 A1    Dec. 7, 2017

(51) Int. Cl.
*G06F 19/00* (2011.01)
*B64D 45/00* (2006.01)
*B64C 3/56* (2006.01)
*G07C 5/08* (2006.01)

(52) U.S. Cl.
CPC ............ *B64D 45/0005* (2013.01); *B64C 3/56* (2013.01); *G07C 5/0808* (2013.01)

(58) Field of Classification Search
CPC ........ B64C 23/065; B64C 23/56; B64C 23/06
USPC .................................................... 701/33.7
See application file for complete search history.

(56) References Cited

U.S. PATENT DOCUMENTS

| | | | |
|---|---|---|---|
| 4,881,766 A * | 11/1989 | Schmidt | E05B 17/2026 292/201 |
| 5,201,479 A | 4/1993 | Renzelmann | |
| 5,350,135 A | 9/1994 | Renzelmann et al. | |
| 5,379,969 A | 1/1995 | Marx et al. | |
| 5,381,986 A | 1/1995 | Smith et al. | |
| 5,427,329 A * | 6/1995 | Renzelmann | B64C 3/56 244/49 |
| 5,452,643 A | 9/1995 | Smith et al. | |
| 8,522,582 B2 * | 9/2013 | Keightley | E05B 35/10 70/278.2 |
| 8,733,692 B2 | 5/2014 | Kordel et al. | |
| 9,045,217 B2 | 6/2015 | Kordel et al. | |
| 9,211,946 B2 * | 12/2015 | Good | B64C 3/56 |
| 2013/0099060 A1 | 4/2013 | Dees et al. | |
| 2014/0014768 A1 | 1/2014 | Lassen et al. | |

(Continued)

FOREIGN PATENT DOCUMENTS

| | | |
|---|---|---|
| EP | 2727828 A2 | 5/2014 |
| EP | 2899119 A1 | 7/2015 |
| WO | WO2011051703 A2 | 5/2011 |

OTHER PUBLICATIONS

Extended European Search report dated Oct. 12, 2017, regarding Application No. 17174455.0, 8 pages.

*Primary Examiner* — McDieunel Marc
(74) *Attorney, Agent, or Firm* — Yee & Associates, P.C.

(57) ABSTRACT

A latch pin actuator comprises a primary lock, a spring, and a piston. The primary lock is attached to a primary lock cam and has a notch. The spring is biased to lock the primary lock. The piston is configured to unlock the primary lock.

31 Claims, 16 Drawing Sheets

(56) References Cited

U.S. PATENT DOCUMENTS

2014/0117150 A1  5/2014  Good et al.
2015/0014478 A1  1/2015  Lassen et al.
2016/0207608 A1* 7/2016  Good .................... B64C 23/065

* cited by examiner

FIG. 16
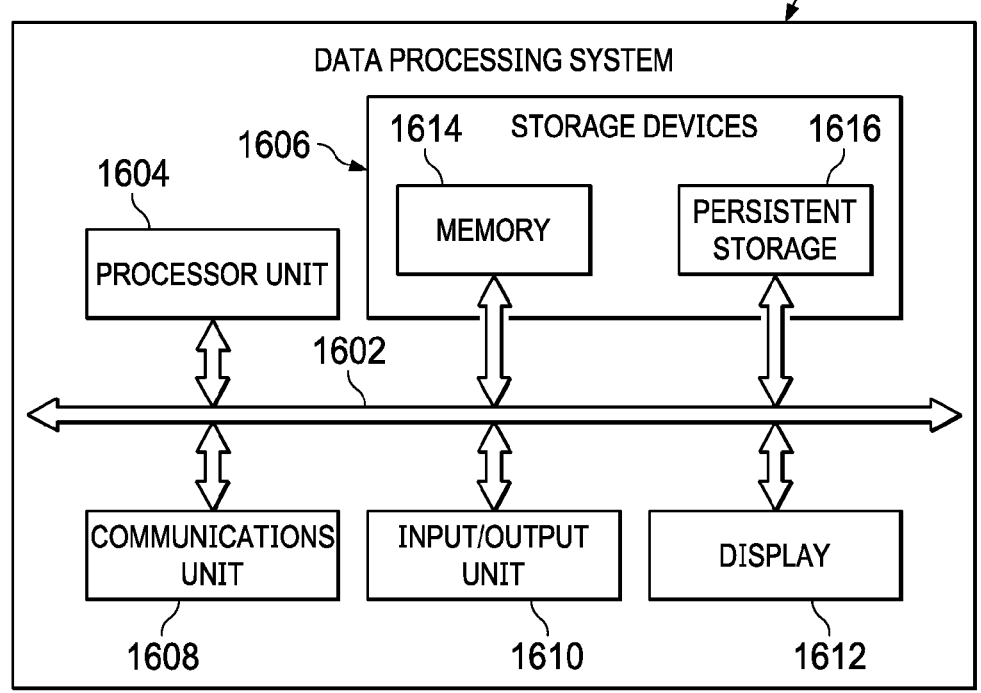
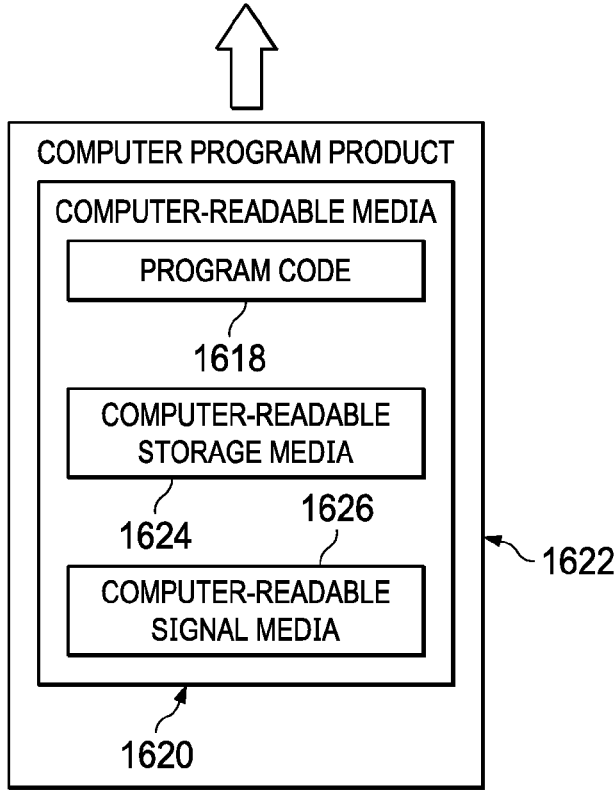

FOLDING WING SYSTEM

BACKGROUND INFORMATION

1. Field

This disclosure relates to systems and methods for controlling wings, and more specifically, to systems and methods for controlling wingtips to enhance aircraft performance and fuel efficiency.

2. Background

In the commercial air transport industry, it is desirable to design aircraft configurations that yield reduced fuel burn per seat-mile, as fuel burn per seat-mile is a measure of fuel efficiency. Efficient aircraft configurations are ever more important as fuel costs continue to increase. Aircraft aerodynamic drag and fuel burn are generally reduced as the aspect ratio of the aircraft wing increases. Similarly, operating larger aircraft which carry more passengers and payload is generally more efficient between two destinations than flying several trips with smaller aircraft. Thus, larger aircraft and aircraft with longer wingspans tend to be more efficient. However, taxiway spacing and gate locations for most airports were designed for aircraft with smaller wingspans than many aircraft that may be produced with today's technology.

A folding wing design may be used to reduce the span of wings to fit within the limitations of an existing airport's infrastructure. A folding wing design may have folding wing tips that may be folded to fit within runways, taxiways, and gate areas, and that may be extended prior to takeoff to increase wingspan.

For each design of aircraft, folding wing systems present different considerations. For example, different aircraft designs have different wing sizes and shapes. Further, different aircraft designs have different wiring and component locations within the wings.

Therefore, it would be desirable to have a method and apparatus that take into account at least some of the issues discussed above, as well as other possible issues. Specifically, one issue is to find a method and apparatus for folding and extending a folding wing tip.

SUMMARY

An illustrative embodiment of the present disclosure provides a latch pin actuator. The latch pin actuator comprises a primary lock, a spring, and a piston. The primary lock is attached to a primary lock cam and has a fracture evident geometry. The spring is biased to lock the primary lock. The piston is configured to unlock the primary lock.

Another illustrative embodiment of the present disclosure provides a folding wing system. The folding wing system comprises a number of latch pin actuators and a sensor system. The number of latch pin actuators each has a latch pin parallel to a wing fold hinge line of the folding wing system.

A further illustrative embodiment of the present disclosure provides a method of indirectly determining primary lock failure of any of a number of latch pin actuators in a folding wing system. Commands are sent to move a wing tip. A position of the wing tip is determined using a wing tip position sensor associated with a wing fold hinge line. Positions of a number of secondary locks are sensed using a number of secondary lock sensors. The position of the wing tip is compared to an expected position of the wing tip. The positions of the number of secondary locks are compared to an expected position of the number of secondary locks. A primary lock failure is determined if at least one of the position of the wing tip is not in the expected position of the wing tip or the positions of the number of secondary locks are not in the expected position of the number of secondary locks.

A yet further illustrative embodiment of the present disclosure provides a secondary lock crank arm assembly. The secondary lock crank arm assembly comprises a quill shaft, a crank arm, and a spring. The quill shaft has a quick release mechanism, wherein the quick release mechanism is configured to provide a quick release from a latch pin actuator. The crank arm is configured to interface with the quill shaft. The spring biases the quill shaft into an engaged position with the crank arm.

A still further illustrative embodiment of the present disclosure provides a folding wing system. The folding wing system comprises a number of latch pin actuators, a number of secondary lock linkages, and a number of lock crank arm assemblies. The number of latch pin actuators each has a latch pin parallel to a wing fold hinge line of the folding wing system. The number of secondary lock linkages is connected in series and parallel to the wing fold hinge line of the folding wing system. The number of lock crank arm assemblies connects the number of latch pin actuators to the number of secondary lock linkages.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 16 is an illustration of a data processing system in the form of a block diagram in accordance with an illustrative embodiment;

DETAILED DESCRIPTION

The illustrative embodiments may recognize and take into account one or more different considerations. For example, the illustrative embodiments recognize and take into account that an aircraft may benefit from a long wingspan in flight, while being able to reduce the wingspan when operating at an airport, such as, but not limited to, International Civil Aviation Organization "code E" or Federal Aviation Administration "group V" airports, may be desirable with respect to increasing the flexibility of where an aircraft may operate. In particular, by being able to reduce the wingspan while on the ground, an aircraft may be able to operate at more airports than if the aircraft could not reduce its wingspan while on the ground. With the longer wingspan during flight, benefits may include fuel efficiency.

The illustrative embodiments further recognize and take into account that conventional folding wing tip designs include latch pins that are perpendicular to the folding wing tip hinge line. Further, the illustrative embodiments recognize and take into account that conventional folding wing tip designs have secondary locks of the latch pin actuators driven by an in-line system. However, the illustrative embodiments recognize and take into account that geometry and space constraints may not allow for in-line driving of the secondary locks.

The illustrative embodiments thus recognize and take into account that using a branched driveline may be advantageous. However, using the branched driveline causes some failure modes of conventional latch pin actuators to be undetectable. Thus, the illustrative embodiments recognize and take into account that a different design is needed for any latch pin actuators connected to a branched driveline.

The illustrative embodiments further recognize and take into account that maintenance and repair of aircraft contribute to undesirable downtime for commercial flights. Further, maintenance and repair contributes to loss of revenue for commercial flights. For example, some revenue flights may need to be canceled or delayed to perform maintenance or trouble-shooting. Thus, the illustrative embodiments recognize and take into account that reducing maintenance and trouble-shooting downtime is desirable.

Figure 1:
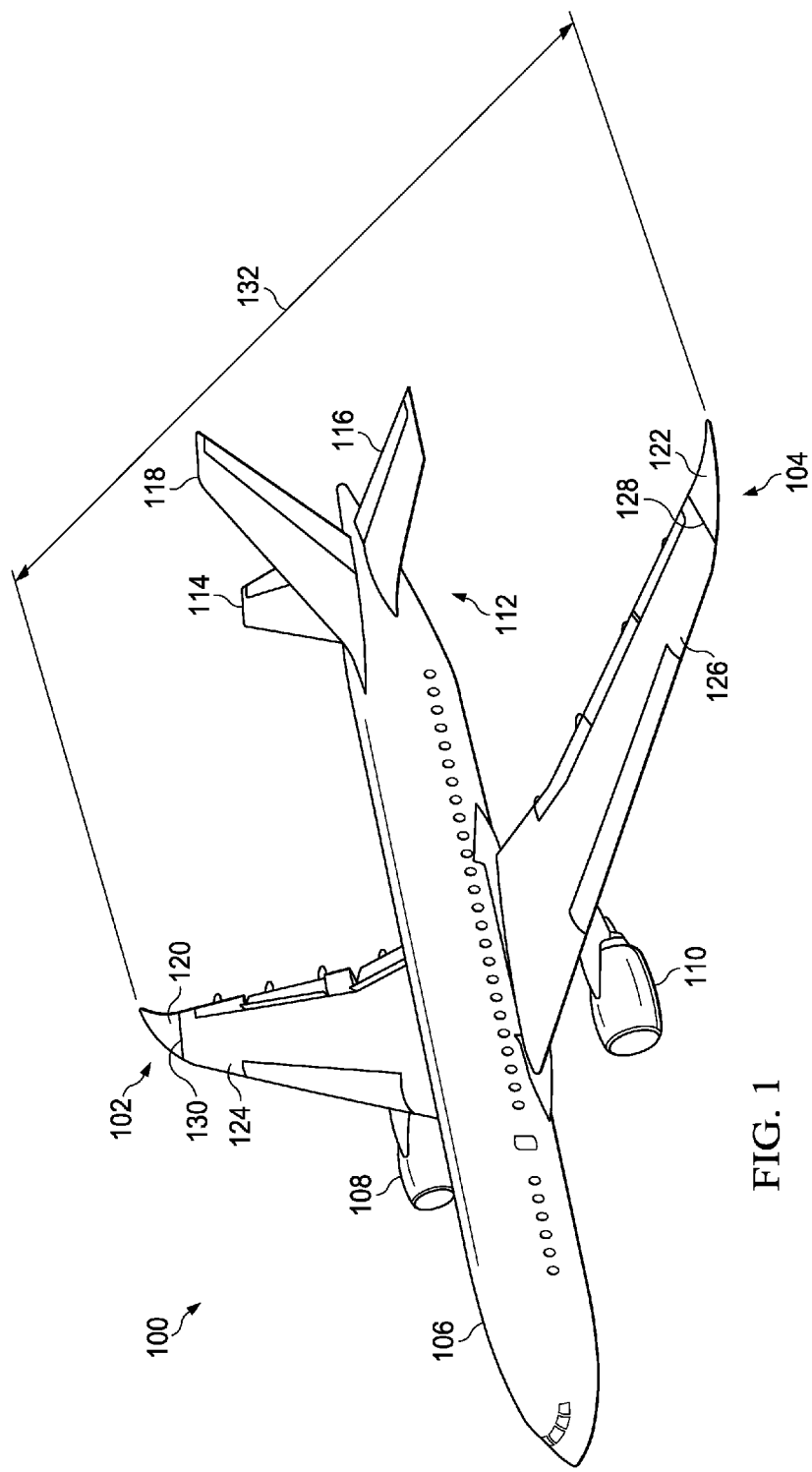
FIG. 1 is an illustration of an aircraft having a folding wing system in accordance with an illustrative embodiment.
Figure 2:
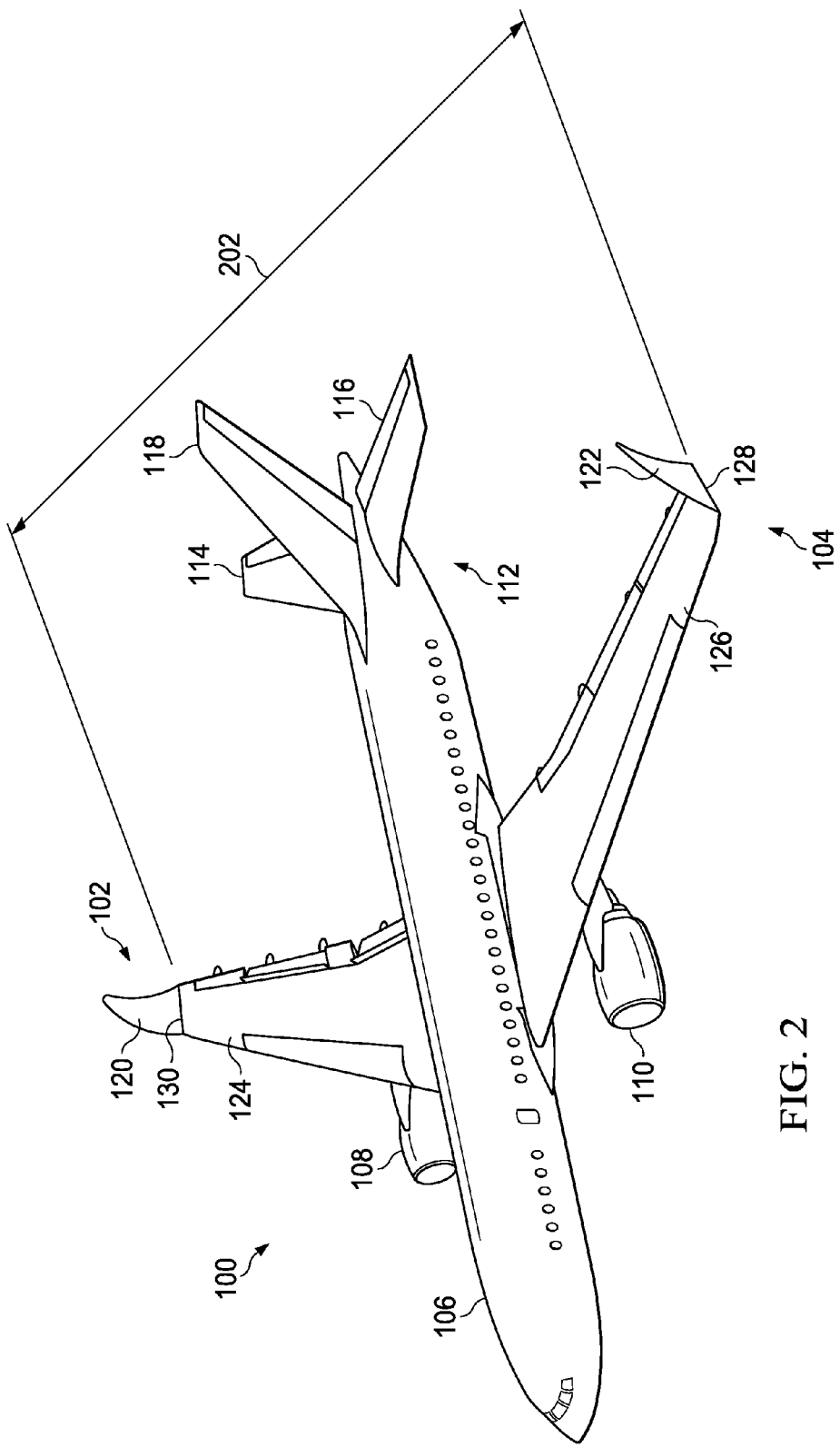
FIG. 2 is an illustration of an aircraft having a folding wing system in accordance with an illustrative embodiment.

With reference now to the figures, and in particular, with reference to FIGS. 1 and 2, illustrations of an aircraft having a folding wing system is depicted in accordance with illustrative embodiments. FIG. 1 depicts aircraft 100 in a flight position, while FIG. 2 depicts aircraft 100 in a taxiing or folded position. Reference numerals used in FIG. 1 are also used in FIG. 2.

Aircraft 100 is an example of an aircraft in which a folding wing system may be implemented in accordance with an illustrative embodiment. In the illustrative embodiment, aircraft 100 includes wing 102 and wing 104 attached to body 106; engine 108 attached to wing 102; and engine 110 attached to wing 104.

Body 106 has tail section 112. Horizontal stabilizer 114, horizontal stabilizer 116, and vertical stabilizer 118 are attached to tail section 112 of body 106. Wing 102 includes fixed portion 124 and unfixed portion 120. Fixed portion 124 is an inboard portion of wing 102, which is fixed to body 106. Similarly, wing 104 includes fixed portion 126 and unfixed portion 122.

Wing 104 includes wing fold system 128 to move unfixed portion 122 with respect to fixed portion 126. Wing 102 includes wing fold system 130 to move unfixed portion 120 with respect to fixed portion 124. Wing fold system 128 and wing fold system 130 each include a latch assembly (not depicted in FIG. 1 or FIG. 2) in accordance with an illustrative embodiment.

FIG. 1 depicts wings 102 and 104 of aircraft 100 in a flight position, with wingspan 132. FIG. 2 depicts wings 102 and 104 aircraft 100 in a folded position, with wingspan 202. Wingspan 202 is less than wingspan 132.

Aircraft 100 is an example of an aircraft in which a folding wing system is implemented in accordance with an illustrative embodiment. For example, folding wing system 318 of FIG. 3 below is implemented in at least one of wing 102 or wing 104.

This illustration of aircraft 100 is provided for purposes of illustrating one environment in which the different illustrative embodiments may be implemented. The illustration of aircraft 100 in FIG. 1 is not meant to imply architectural limitations to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable types of aircraft.

Figure 3:
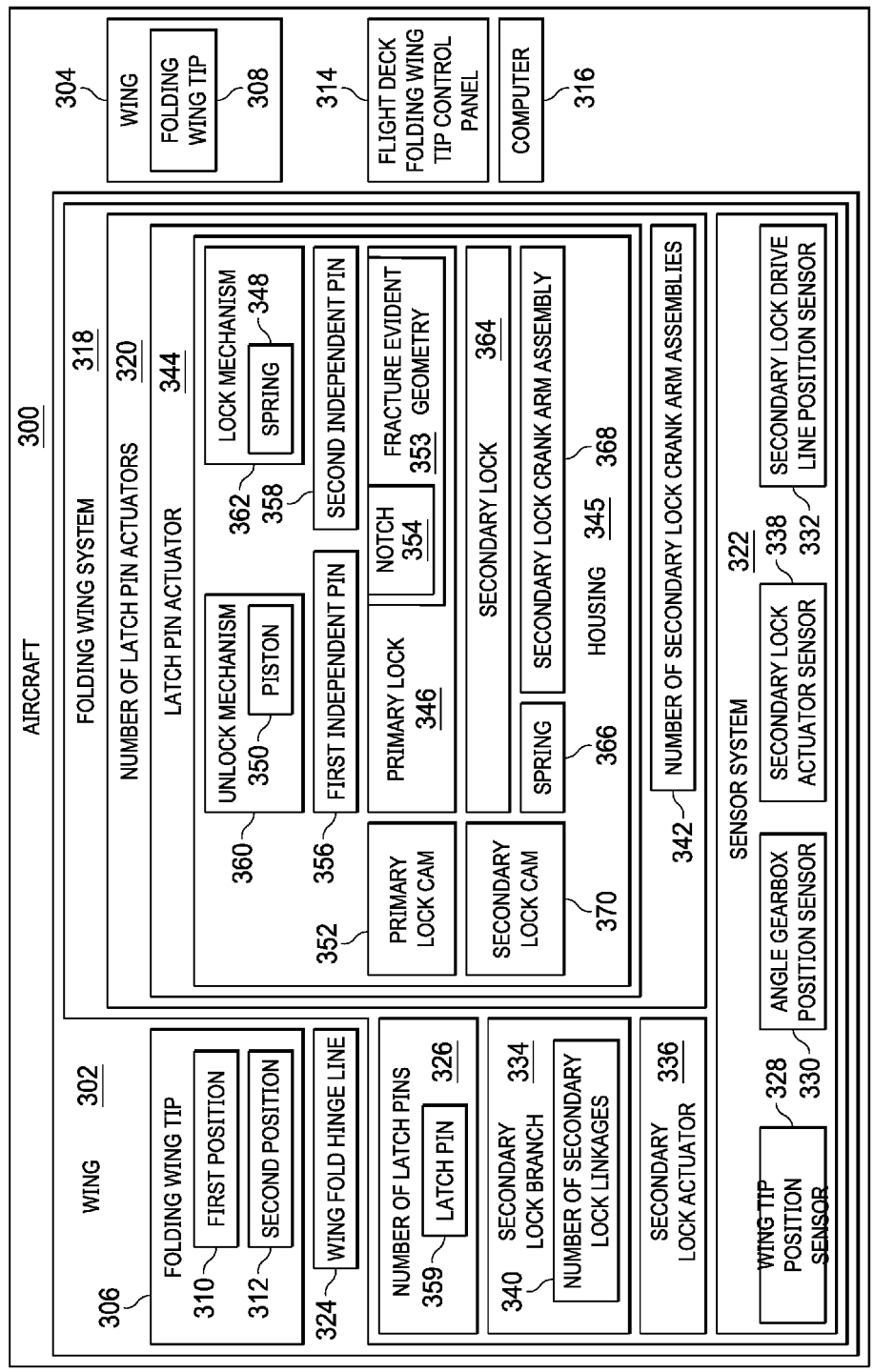
FIG. 3 is an illustration of a block diagram of an aircraft having a folding wing system in accordance with an illustrative embodiment.

Turning now to FIG. 3, an illustration of a block diagram of an aircraft having a number of backup systems is depicted in accordance with an illustrative embodiment. Aircraft 300 is an illustrative embodiment of aircraft 100 depicted in FIG. 1 and FIG. 2.

Aircraft 300 has wing 302 and wing 304. Wing 302 has folding wing tip 306. Wing 304 has folding wing tip 308. Folding wing tip 306 may be moved between first position 310 and second position 312. In some illustrative examples, first position 310 may be an extended or flight position. In a flight position, folding wing tip 306 may be extended such that wing 302 has an increased length. In some illustrative examples, second position 312 may be a folded or taxiing position. In a taxiing position, folding wing tip 306 may be folded such that wing 302 has a shorter length. In some illustrative examples, first position 310 is a taxiing position while second position 312 is a flight position. Folding wing tip 306 moves through a number of transitional locations between first position 310 and second position 312.

Aircraft 300 may also have flight deck folding wing tip control panel 314 and computer 316. Flight deck folding wing tip control panel 314 may control operation of at least one of folding wing tip 306 or folding wing tip 308.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, "at least one of" means any combination of items and number of items may be used from the list, but not all of the items in the list are required.

Without limitation, flight deck folding wing tip control panel 314 may include a switch, a screen or a device in a cockpit, a controller, or some other processor in or linked to aircraft 300. An aircraft operator may be a crew member in a cockpit, or another operator, which may be a processor. Flight deck folding wing tip control panel 314 may allow for inputs from a crew member or other operator to control at least one of folding wing tip 306 or folding wing tip 308.

Computer 316 may receive inputs from the crew member or other operator. Computer 316 may create commands based on the inputs from the crew member or other operator. For example, computer 316 may create commands to move folding wing tip 306 from first position 310 to second position 312. Further, computer 316 may create commands to move folding wing tip 306 from second position 312 to first position 310.

Folding wing system 318 moves folding wing tip 306 from first position 310 to second position 312. Folding wing system 318 includes number of latch pin actuators 320 and sensor system 322. Number of latch pin actuators 320 each has a latch pin parallel to wing fold hinge line 324 of folding wing system 318. For example, number of latch pins 326 is associated with number of latch pin actuators 320. Sensor system 322 is configured to indirectly detect failure of a primary lock of any of number of latch pin actuators 320.

In some examples, sensor system 322 includes only four sensors. When sensor system 322 includes four sensors, two of the sensors may be backup sensors. In other examples, sensor system 322 includes only two sensors.

As depicted, sensor system 322 comprises wing tip position sensor 328 associated with wing fold hinge line 324. Sensor system 322 further comprises angle gearbox position sensor 330 attached to an angle gearbox and associated with wing fold hinge line 324. In some illustrative examples, one of wing tip position sensor 328 or angle gearbox position sensor 330 is a backup for the other of wing tip position sensor 328 or angle gearbox position sensor 330. At least one of wing tip position sensor 328 or angle gearbox position sensor 330 indirectly detects a primary lock fracture of one of number of latch pin actuators 320 upon commanding folding wing tip 306 to fold.

Sensor system 322 also includes secondary lock drive line position sensor 332 connected to a first end of secondary lock branch 334. Secondary lock branch 334 connects secondary lock actuator 336 to secondary locks of number of latch pin actuators 320. Secondary lock drive line position sensor 332 indirectly detects jamming of a primary lock of one of number of latch pin actuators 320.

As depicted, sensor system 322 also includes secondary lock actuator sensor 338 connected to secondary lock actuator 336. Secondary lock actuator sensor 338 indirectly detects jamming of a primary lock of one of number of latch pin actuators 320. In some illustrative examples, at least one of secondary lock actuator sensor 338 or secondary lock drive line position sensor 332 is a backup for the other of secondary lock actuator sensor 338 or secondary lock drive line position sensor 332.

Folding wing system 318 includes number of secondary lock linkages 340 and number of secondary lock crank arm assemblies 342. Number of secondary lock linkages 340 is connected in series and parallel to wing fold hinge line 324 of folding wing system 318. Number of secondary lock linkages 340 forms secondary lock branch 334 that connects secondary lock actuator 336 to number of latch pin actuators 320. Number of secondary lock crank arm assemblies 342 connects number of latch pin actuators 320 to number of secondary lock linkages 340. Number of secondary lock crank arm assemblies 342 is part of number of latch pin actuators 320. In some examples, number of secondary lock crank arm assemblies 342 is a number of quick release crank arm assemblies.

In some examples, folding wing system 318 includes two secondary lock sensors directly connected to number of secondary lock linkages 340 connected in series. In some examples, the two secondary lock sensors are secondary lock drive line position sensor 332 at a first end of the series and secondary lock actuator sensor 338 at a second end of the series. Number of secondary lock linkages 340 takes the form of at least one of a single solid rod, a swing link with lost motion, or cables and pulleys.

Latch pin actuator 344 is one of number of latch pin actuators 320. Housing 345 of latch pin actuator 344 surrounds some components of latch pin actuator 344. Latch pin actuator 344 comprises primary lock 346, spring 348, and piston 350. Primary lock 346 is attached to primary lock cam 352. Primary lock 346 has fracture evident geometry 353. As used herein, the term "fracture evident geometry" is defined as a geometry of a part or a feature or cut-out of a part, for which a fracture is visibly apparent to the naked eye when the part, geometry, or cut-out fracture is visually inspected. A "fracture evident geometry" requires an engineering structure or shape of a part such that when the part or shape fractures, the fracture will be visible to the naked eye upon visual inspection.

In some illustrative examples, fracture evident geometry 353 takes the form of notch 354. Notch 354 is configured to fracture under a designated force or abnormal wear. A "designated force" is a predetermined force, with the notch engineered to tolerate up to and possibly including that predetermined force, but the notch will fracture when subjected to a force above (or possibly equal to) the predetermined force. "Abnormal wear" is defined as wear exceeding that expected by ordinary operation and maintenance of the aircraft of which the notch is a part.

In other illustrative examples, primary lock 346 does not have notch 354. In these examples, when the latch pin travels to the retracted position, the latch pin 359 fully overlaps or intersects the primary lock 346 in a locked position, latch pin 359 would completely sever primary lock 346 even without notch 354. In these examples, notch 354 is not present.

Spring 348 is biased to lock primary lock 346. Piston 350 is configured to unlock primary lock 346. First independent pin 356 connects piston 350 to primary lock 346 on a first side of notch 354 of primary lock 346. Second independent pin 358 connects spring 348 to primary lock 346 on a second side of notch 354 of primary lock 346.

Notch 354 is configured to fracture under a designated force. Notch 354 is configured to fracture under at least one of the following: material inconsistencies, manufacturing inconsistencies, or wear from latch pin 359 sliding against primary lock 346 as latch pin 359 moves. Manufacturing inconsistencies can include undesirable heat treatment, undesirable cooling, or any other type of manufacturing inconsistency from a desirable manufacturing process.

By piston 350 and spring 348 being connected to primary lock 346 using two independent pins, first independent pin 356 and second independent pin 358, primary lock 346 does not function when notch 354 fractures. If piston 350 and spring 348 were connected to primary lock 346 using the same pin, primary lock 346 could function appropriately despite notch 354 fracturing. Spring 348 biases a first side of primary lock 346 such that associated latch pin 359 is prohibited from unlocking when primary lock 346 is fractured. Primary lock 346 is desirably functional in the absence of power or commands.

Although latch pin actuator 344 is described as having piston 350, piston 350 is only one example of unlock mechanism 360. Unlock mechanism 360 takes the form of any desirable actuation method. For example, unlock mechanism 360 may be a hydraulic actuator, an electric motor, solenoid actuation, a pneumatic actuator, or any other desirable form of actuation. Further, although latch pin actuator 344 is described as having spring 348, spring 348 is only one example of lock mechanism 362. Lock mechanism 362 takes the form of any desirable biasing method. For example, lock mechanism 362 may be a pressurized pneumatic piston, a pressurized hydraulic accumulator, a magnetic mechanism, or any other desirable type of locking mechanism.

Latch pin actuator 344 further includes secondary lock 364, spring 366, and secondary lock crank arm assembly 368. Spring 366 is biased to lock secondary lock 364 such that secondary lock 364 is desirably functional in the absence of power or commands. Secondary lock crank arm assembly 368 is connected to secondary lock 364. In some examples, secondary lock crank arm assembly 368 takes the form of a quick release swing link crank arm assembly. Secondary lock 364 is attached to secondary lock cam 370.

Each of number of latch pin actuators 320 is connected to secondary lock actuator 336 in a branch arrangement using secondary lock branch 334. Each of primary lock 346, secondary lock 364, primary lock cam 352, and secondary lock cam 370 are shaped and positioned to allow for detection of loss of function of latch pin actuator 344 when latch pin actuator 344 is positioned in a branch arrangement. In some illustrative examples, each of number of latch pin actuators 320 has the same design as latch pin actuator 344.

Design and layout of latch pin actuator 344 are configured to allow for detection of loss of functionality when number of latch pins 326 is parallel to wing fold hinge line 324. The design and layout of latch pin actuator 344 are configured to fit within a specified space of wing 302.

The illustration of aircraft 300 in FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 4:
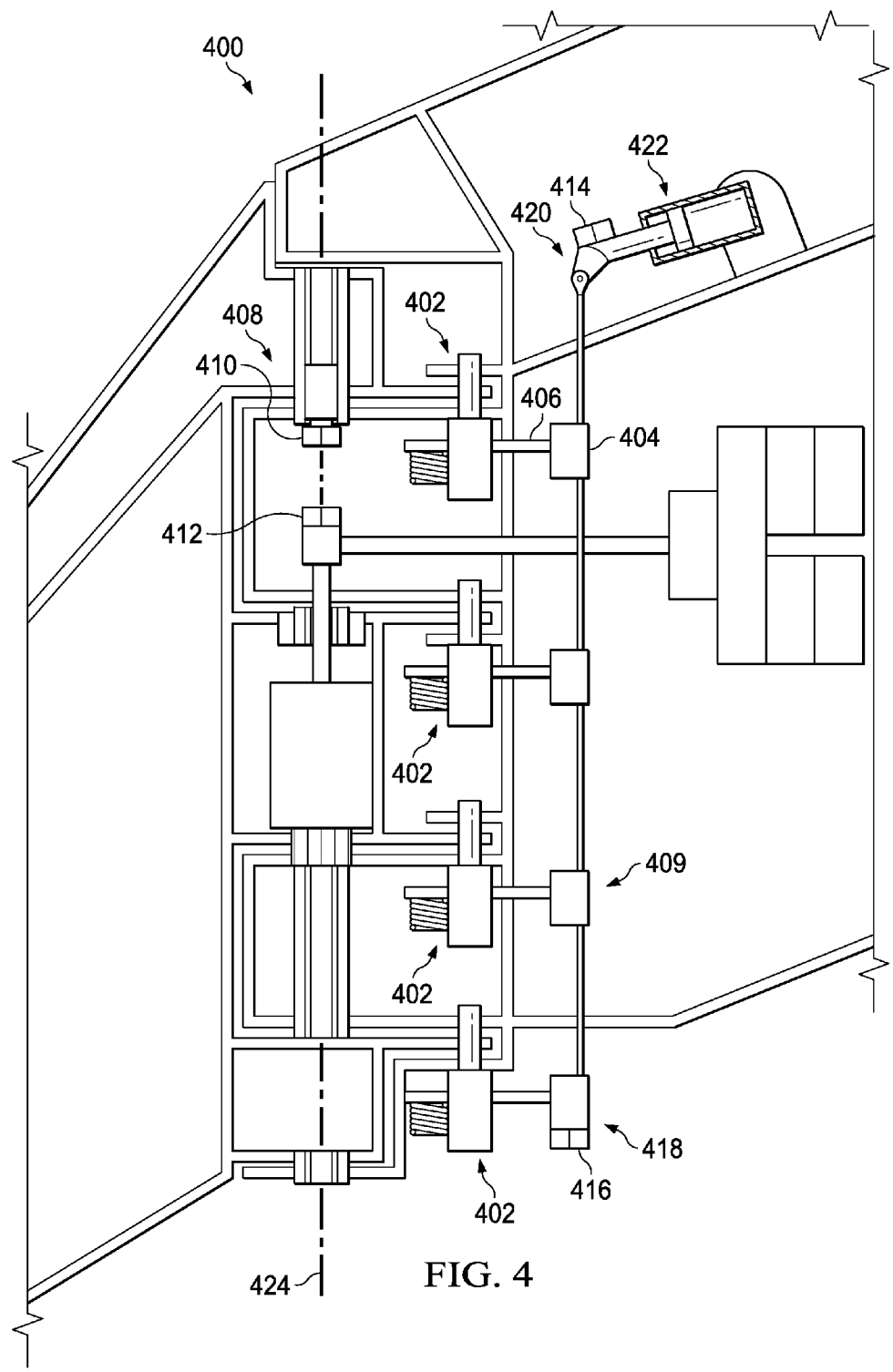
FIG. 4 is an illustration of a wing having a folding wing system implemented in accordance with an illustrative embodiment.

Turning now to FIG. 4, an illustration of a wing having a folding wing system implemented is depicted in accordance with an illustrative embodiment. Folding wing system 400 is a diagrammatic implementation of wing fold system 128 to move unfixed portion 122 of wing 104 in FIGS. 1 and 2. Wing fold system 128 is a diagrammatic representation of folding wing system 318 of FIG. 3.

Folding wing system 400 includes number of latch pin actuators 402, number of secondary lock linkages 404, number of secondary lock crank arm assemblies 406, and sensor system 408. Number of secondary lock linkages 404 forms secondary lock branch 409. As depicted, number of latch pin actuators 402 includes four latch pin actuators. Each latch pin actuator of number of latch pin actuators 402 is connected to number of secondary lock linkages 404 using number of secondary lock crank arm assemblies 406.

As depicted, number of latch pin actuators 402 is positioned in parallel. The design of each of number of latch pin actuators 402 enables detection of loss of functionality of components of any of number of latch pin actuators 402 using sensor system 408. As depicted, sensor system 408 includes only four sensors. More specifically, sensor system 408 includes wing tip position sensor 410, angle gearbox position sensor 412, secondary lock actuator sensor 414, and secondary lock drive line position sensor 416. Secondary lock drive line position sensor 416 is positioned at first end 418 of number of secondary lock linkages 404 positioned in series. Secondary lock actuator sensor 414 is positioned at second end 420 of number of secondary lock linkages 404 positioned in series.

Secondary lock actuator sensor 414 and secondary lock drive line position sensor 416 are used in connection to detect loss of functionality of one of number of latch pin actuators 402. For example, at least one of secondary lock actuator sensor 414 or secondary lock drive line position sensor 416 detects jamming of a primary lock of one of number of latch pin actuators 402. Wing tip position sensor 410 and angle gearbox position sensor 412 are used in connection to detect the loss of functionality of one of number of latch pin actuators 402. For example, at least one of wing tip position sensor 410 or angle gearbox position sensor 412 indirectly detects a primary lock fracture of one of number of latch pin actuators 402.

Number of secondary lock linkages 404 connects number of latch pin actuators 402 to secondary lock actuator 422. Each of number of secondary lock crank arm assemblies 406 connects number of secondary lock linkages 404 to a respective latch pin actuator of number of latch pin actuators 402. In some illustrative examples, number of secondary lock crank arm assemblies 406 is a number of quick release crank arm assemblies. When number of secondary lock crank arm assemblies 406 is a number of quick release crank arm assemblies, maintenance time is reduced.

Each of number of latch pin actuators 402 has a design to fit within folding wing system 400. As depicted, each of number of latch pin actuators 402 has a latch pin parallel to wing fold hinge line 424. Components of number of latch pin actuators 402 are configured to move the number of latch pins between a locked position and an unlocked position. The components of number of latch pin actuators 402 are configured to enable detection of the loss of functionality of any of number of latch pin actuators 402.

Figure 5:
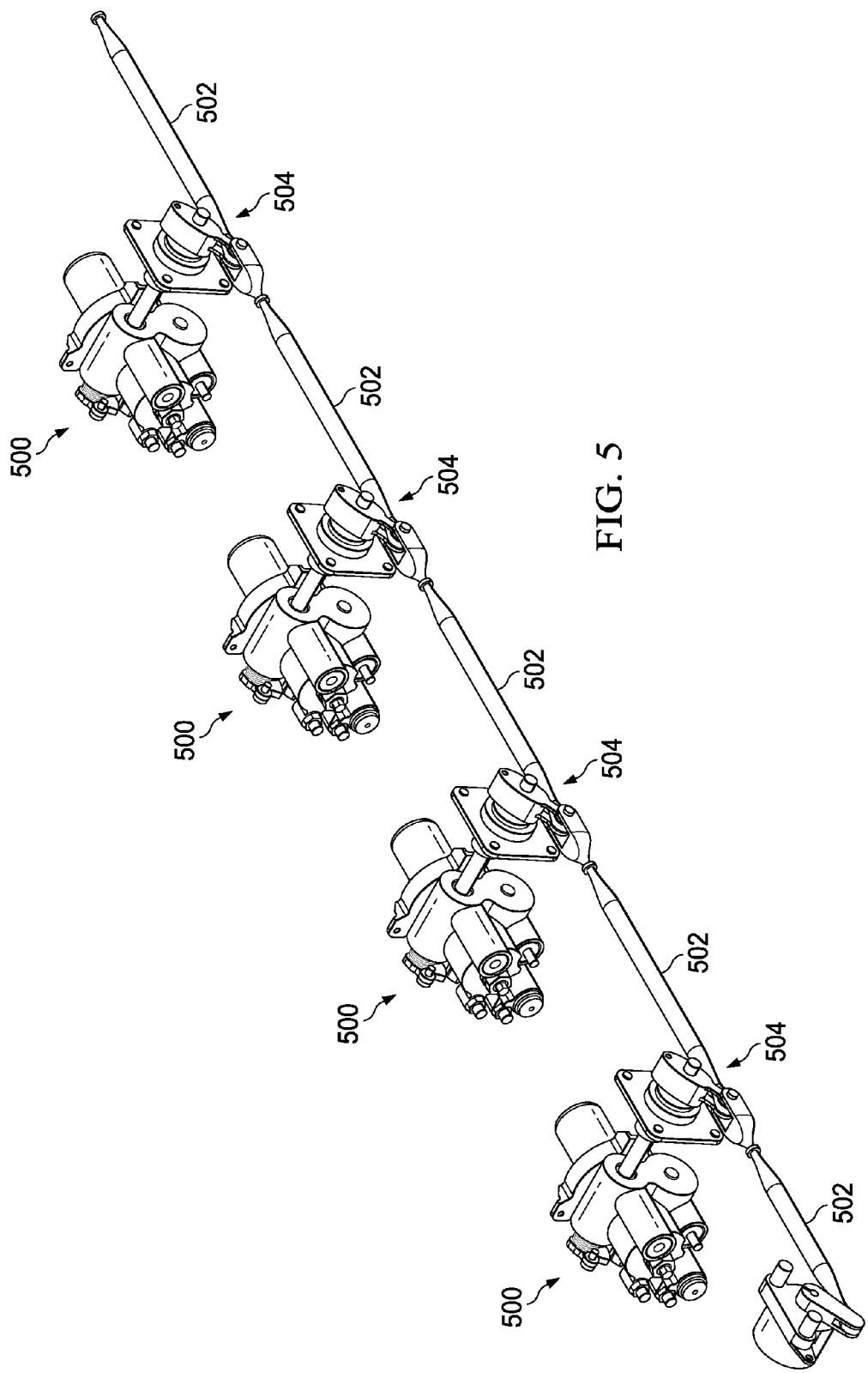
FIG. 5 is an illustration of a number of latch pin actuators in accordance with an illustrative embodiment.

Turning now to FIG. 5, an illustration of a number of latch pin actuators is depicted in accordance with an illustrative embodiment. Number of latch pin actuators 500 is a physical implementation of number of latch pin actuators 320 of FIG. 3. Number of latch pin actuators 500 is a portion of folding wing system 400 of FIG. 4. As depicted, number of latch pin actuators 500 is connected to number of secondary lock linkages 502 using number of secondary lock linkages 504.

Figure 6:
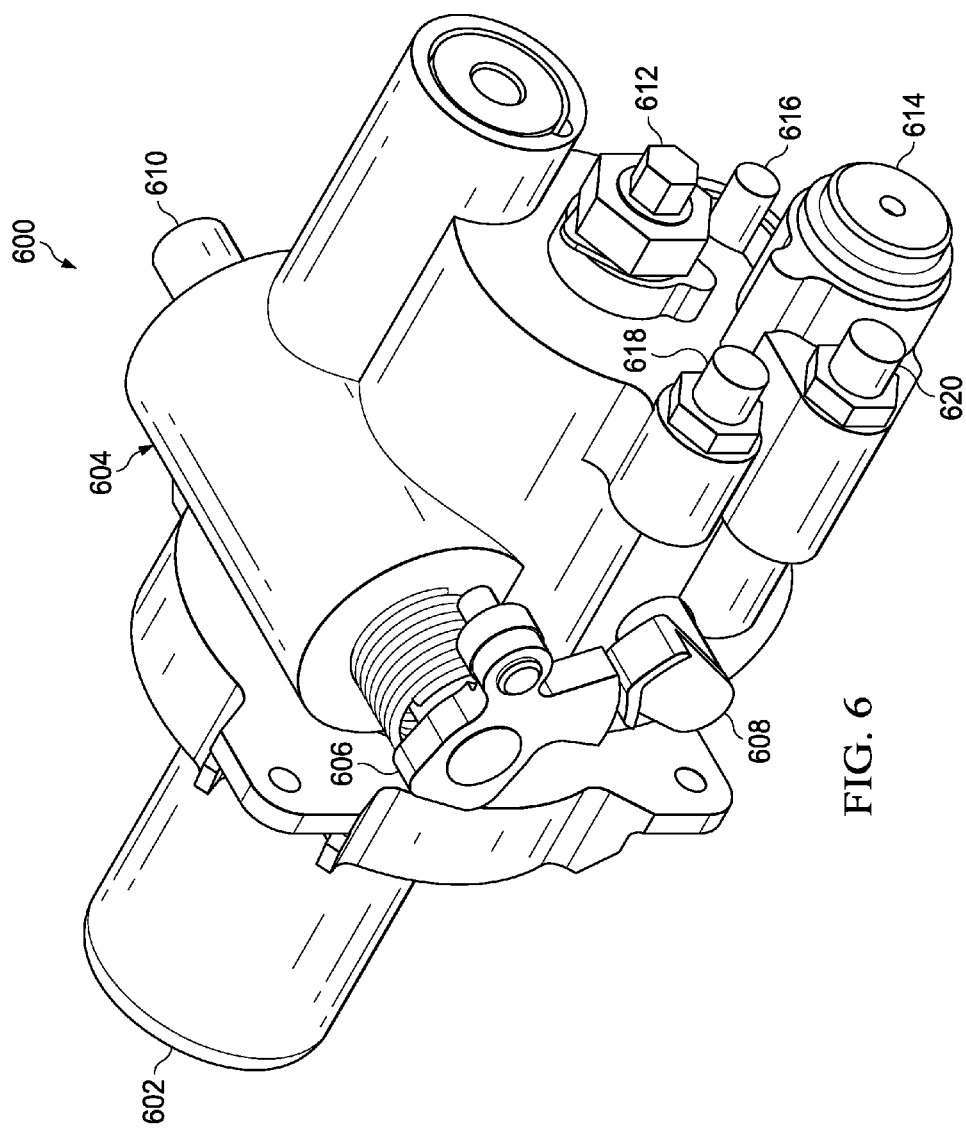
FIG. 6 is an illustration of an isometric view of a latch pin actuator in accordance with an illustrative embodiment.

Turning now to FIG. 6, an illustration of an isometric view of a latch pin actuator is depicted in accordance with an illustrative embodiment. Latch pin actuator 600 is a physical implementation of latch pin actuator 344 of FIG. 3. Latch pin actuator 600 is an example of an actuator of number of latch pin actuators 500 of FIG. 5. Latch pin actuator 600 is a physical implementation of an actuator in folding wing system 400 of FIG. 4.

Latch pin actuator 600 moves latch pin 602 between a locked position and an unlocked position. Latch pin actuator 600 includes housing 604 encompassing internal components. Secondary lock cam 606 and primary lock cam 608 are outside of housing 604. Secondary lock cam 606 is moved by a secondary lock inside of housing 604. The secondary lock is actuated using secondary lock crank arm assembly 610. The secondary lock is biased by secondary biasing system 612. In some illustrative examples, secondary biasing system 612 includes a spring biased to lock the secondary lock.

Primary lock cam 608 is moved by a primary lock inside of housing 604. The primary lock is actuated using unlock system 614. In FIG. 6, only the end cap of unlock system 614 is visible. In some examples, unlock system 614 is a piston. The primary lock is biased to a locked position. Primary biasing system 616 includes any desirable type of component. In FIG. 6, only the end cap of primary biasing system 616 is visible.

Housing 604 also has latch hydraulic port 618 and unlatch hydraulic port 620. Latch hydraulic port 618 and unlatch hydraulic port 620 control movement of latch pin 602 into and out of housing 604.

Figure 7:
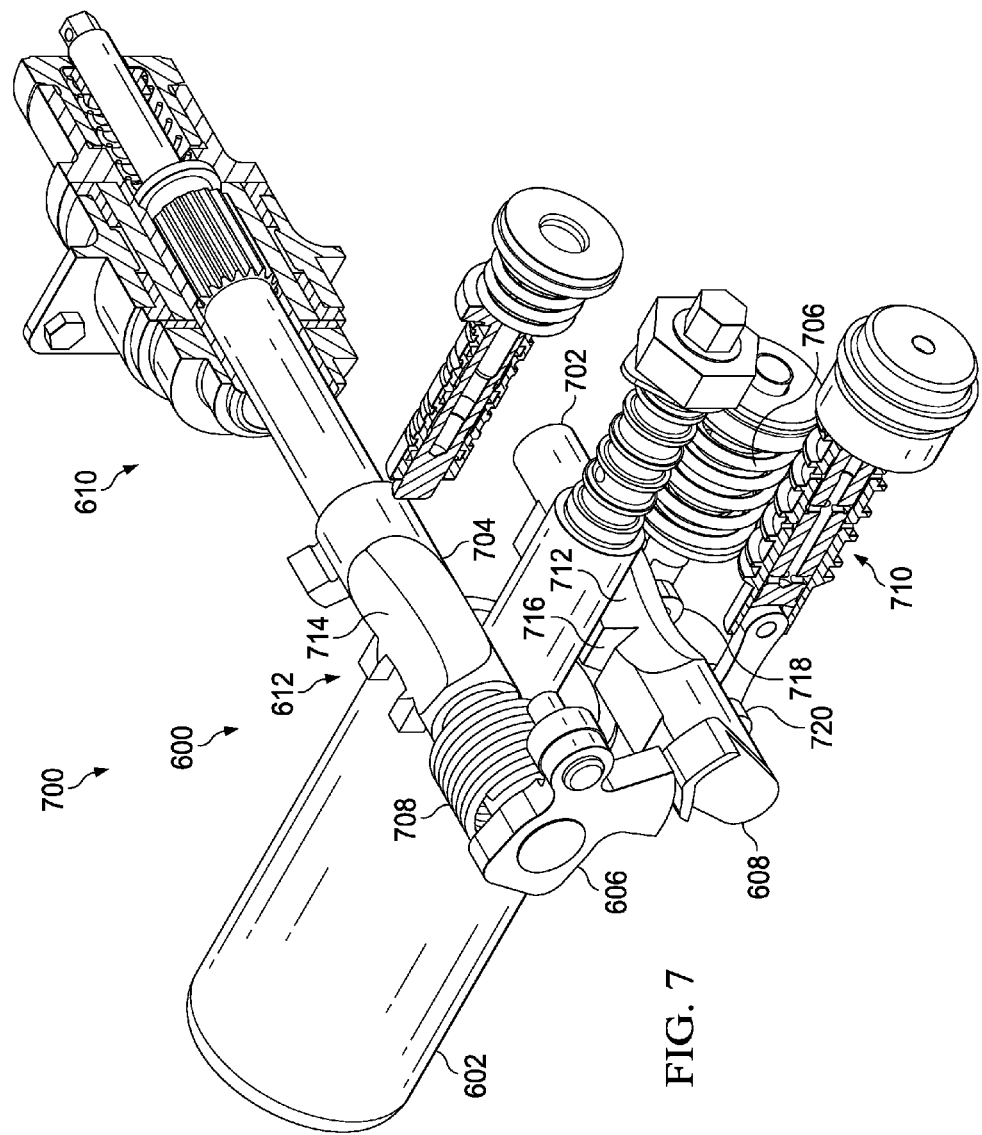
FIG. 7 is an illustration of an isometric view of a latch pin actuator with a transparent housing in accordance with an illustrative embodiment.

Turning now to FIG. 7, an illustration of an isometric view of a latch pin actuator with a housing removed is depicted in accordance with an illustrative embodiment. View 700 is a view of latch pin actuator 600 with housing 604 removed.

As depicted, latch pin actuator 600 includes primary lock 702, secondary lock 704, spring 706, spring 708, and piston 710. Spring 706 biases primary lock 702 to a locked position. Spring 706 is an implementation of primary biasing system 616 of FIG. 6. Spring 708 biases secondary lock 704 to a locked position. Spring 708 is an implementation of secondary biasing system 612. Piston 710 provides an actuation mechanism to unlock primary lock 702.

As depicted, primary lock 702 and secondary lock 704 have respective curvatures to allow latch pin 602 into housing 604 (not depicted) when primary lock 702 and secondary lock 704 are in unlocked positions. For example, primary lock 702 has curvature 712 and secondary lock 704 has curvature 714. When primary lock 702 and secondary lock 704 are in locked positions, latch pin 602 is prevented from entering housing 604. For example, neither curvature 712 nor curvature 714 face latch pin 602 when primary lock 702 and secondary lock 704 are in locked positions.

Primary lock 702 further includes notch 716. Notch 716 enables a sensor system to determine if primary lock 702 is functioning. For example, notch 716 fractures under a predetermined load. As another example, notch 716 fractures under abnormal wear. Accordingly, a portion of primary lock 702 does not actuate when notch 716 fractures. This non-actuating portion of primary lock 702 blocks latch pin 602 from entering housing 604. Notch 716 is a non-limiting example of a "fracture evident geometry."

Spring 706 and piston 710 are connected to primary lock 702 using independent pins. Spring 706 is connected to primary lock 702 using second independent pin 718. Piston 710 is connected to primary lock 702 using first independent pin 720. First independent pin 720 and second independent pin 718 enable a portion of primary lock 702 to not actuate when notch 716 fractures.

Figure 8:
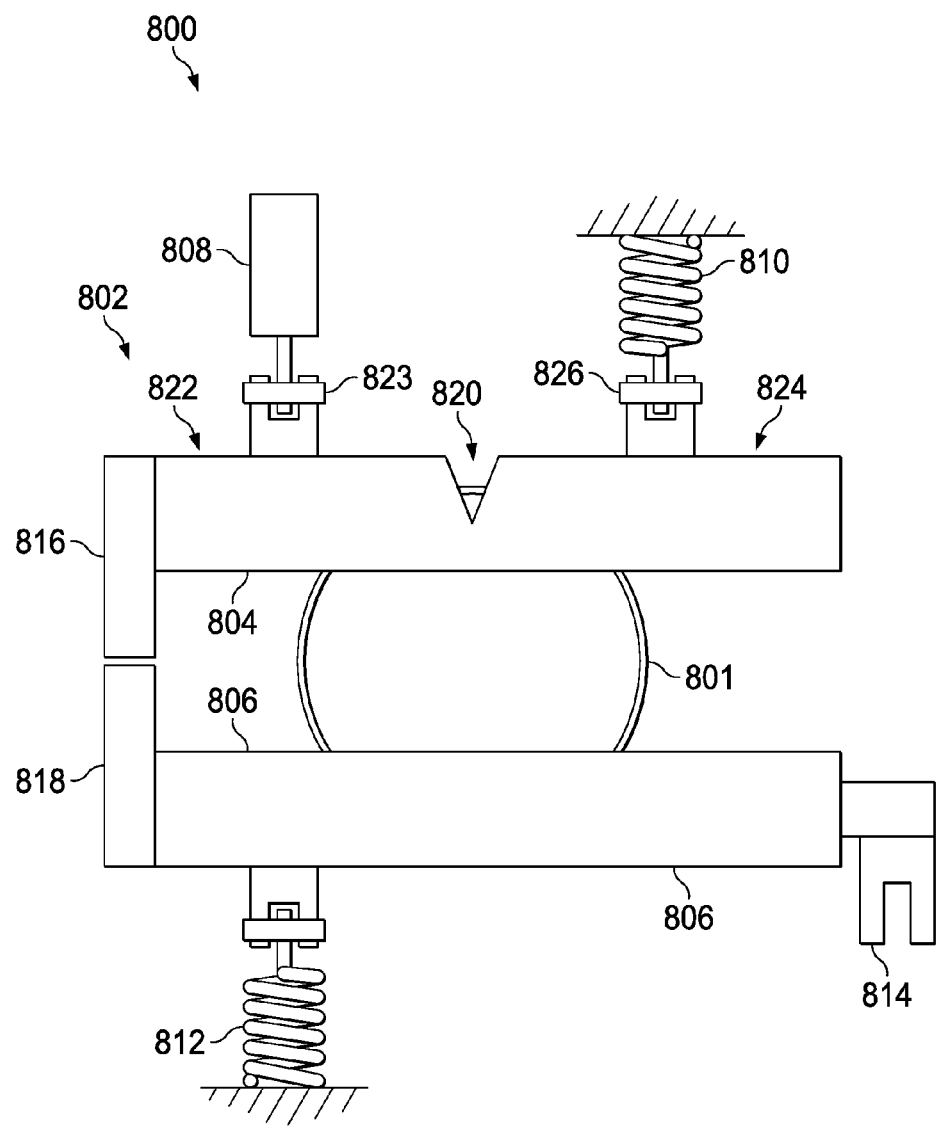
FIG. 8 is an illustration of a simplified diagram of a latch pin actuator in accordance with an illustrative embodiment.

Turning now to FIG. 8, an illustration of a simplified diagram of a latch pin actuator is depicted in accordance with an illustrative embodiment. Diagram 800 is a diagrammatic illustration of latch pin actuator 344 of FIG. 3. Diagram 800 is a diagrammatic illustrative of latch pin actuator 600 of FIG. 6.

Latch pin 801 moves into and out of latch pin actuator 802. Diagram 800 of latch pin actuator 802 includes primary lock 804, secondary lock 806, piston 808, spring 810, spring 812, secondary lock crank arm assembly 814, primary lock cam 816, and secondary lock cam 818. Primary lock 804 includes notch 820. Piston 808 is connected to first side 822 of primary lock 804 using first independent pin 823. Spring 810 is connected to second side 824 of primary lock 804 using second independent pin 826.

Piston 808 actuates primary lock 804 between a locked position and an unlocked position. Spring 810 biases primary lock 804 to the locked position. When notch 820 fractures under a designated force or abnormal wear, piston 808 only actuates first side 822 of primary lock 804. Thus, first independent pin 823 and second independent pin 826 in conjunction with notch 820 enables detection of loss of function for primary lock 804. For example, second side 824 of primary lock 804 will remain engaged with latch pin 801 to prevent normal retraction. Thus, a wing fails to fold when commanded. Failure to fold when commanded is detected by wing tip position sensor 410 of FIG. 4.

Spring 812 biases secondary lock 806 to the locked position. Secondary lock crank arm assembly 814 actuates secondary lock 806 between the locked position and the unlocked position.

During normal operation, primary lock cam 816 and secondary lock cam 818 do not interfere with each other. If a failure results in abnormal sequencing between primary lock cam 816 and secondary lock cam 818, then primary lock cam 816 and secondary lock cam 818 interact mechanically with each other. For example, primary lock cam 816 and secondary lock cam 818 may interfere with each other and allow detection. Thus, primary lock cam 816 and secondary lock cam 818 interact when latch pin actuator 802 is not functioning.

Primary lock cam 816 and secondary lock cam 818 are arranged so that the primary lock does not unlock until the secondary locks are in the unlocked position. The secondary locks do not lock unless the primary locks are in the locked position.

For example, if primary lock 804 is jammed in the unlocked position, primary lock cam 816 will interfere with secondary lock cam 818 as secondary lock cam 818 moves towards the locked position. This will be detected by at least one secondary lock sensor, such as at least one of secondary lock actuator sensor 414 or secondary lock drive line position sensor 416 of FIG. 4. Further, if primary lock 804 wears through to notch 820, prior to takeoff then primary lock cam 816 remains in the unlocked position when commanded to lock. When primary lock cam 816 is in the unlocked position, primary lock cam 816 interferes with secondary lock cam 818 and prevents secondary lock cam 818 from reaching the locked position. If latch pin actuator 802 is commanded to lock, secondary lock 806 cannot reach the locked position. This will be detected by at least one secondary lock sensor, such as at least one of secondary lock actuator sensor 414 or secondary lock drive line position sensor 416 of FIG. 4.

If primary lock 804 wears through to notch 820, and the secondary lock actuator is commanded to unlock, then first side 822 is actuated to the unlocked position and second side 824 remains in the locked position. When second side 824 remains in the locked position, latch pin 801 is prevented from retracting. Wingtip position sensors detect this failure when the wing tip fails to fold.

Figure 9:
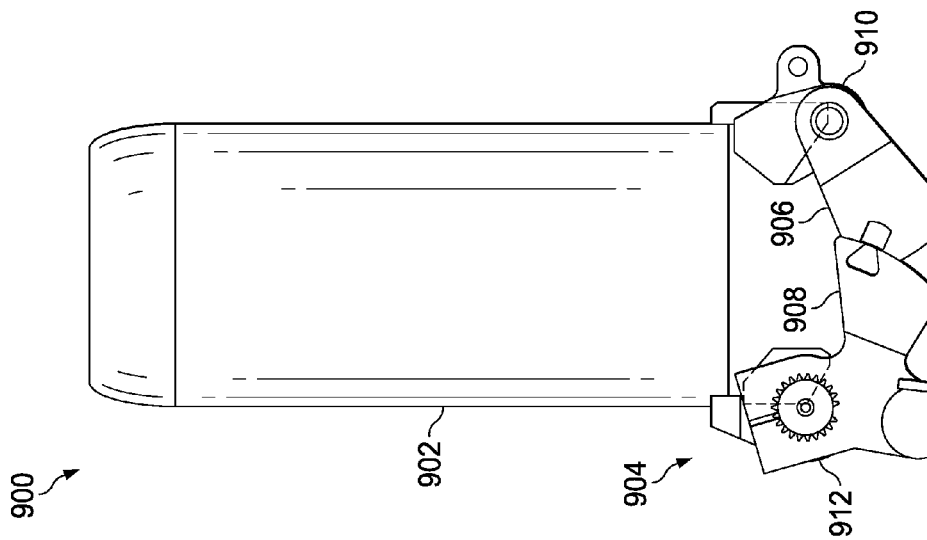
FIG. 9 is an illustration of a side view of a latch pin actuator in accordance with an illustrative embodiment.

Turning now to FIG. 9, an illustration of a side view of a latch pin actuator is depicted in accordance with an illustrative embodiment. View 900 is a view of primary lock cam 352 and secondary lock cam 370 of FIG. 3. View 900 is a simplified view of latch pin actuator 600 of FIG. 6.

In view 900, latch pin 902 is extended from latch pin actuator 904. Further, in view 900, primary lock cam 906 and secondary lock cam 908 is in a locked position. Primary lock cam 906 is connected to primary lock 910. Secondary lock cam 908 is connected to secondary lock 912.

As depicted, each of primary lock 910 and secondary lock 912 are in respective locked positions. As depicted, primary lock 910 and secondary lock 912 obstruct latch pin 902 from retracting into latch pin actuator 904.

Figure 10:
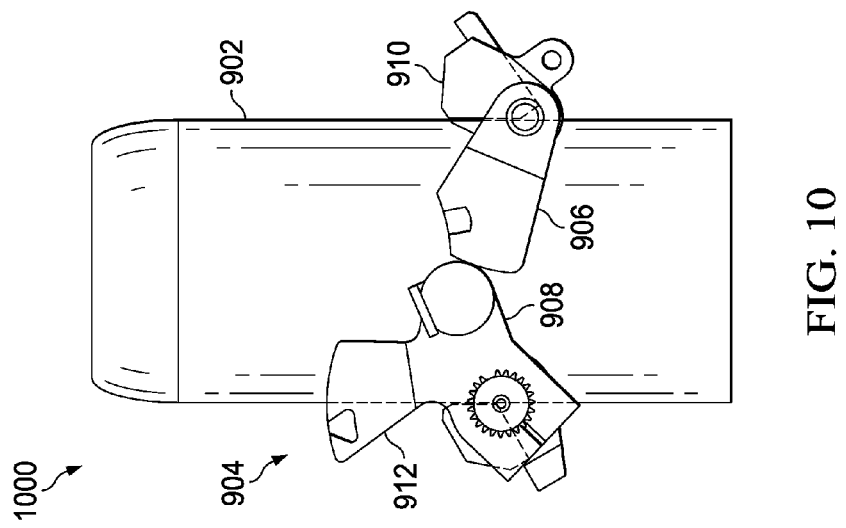
FIG. 10 is an illustration of a side view of a latch pin actuator in accordance with an illustrative embodiment.

Turning now to FIG. 10, an illustration of a side view of a portion of a latch pin actuator is depicted in accordance with an illustrative embodiment. View 1000 is a view of latch pin actuator 904 with latch pin 902 in a retracted position. As depicted, contact between primary lock 910 and latch pin 902 where potential wear could occur leading to fracture of primary lock 910.

Figure 11:
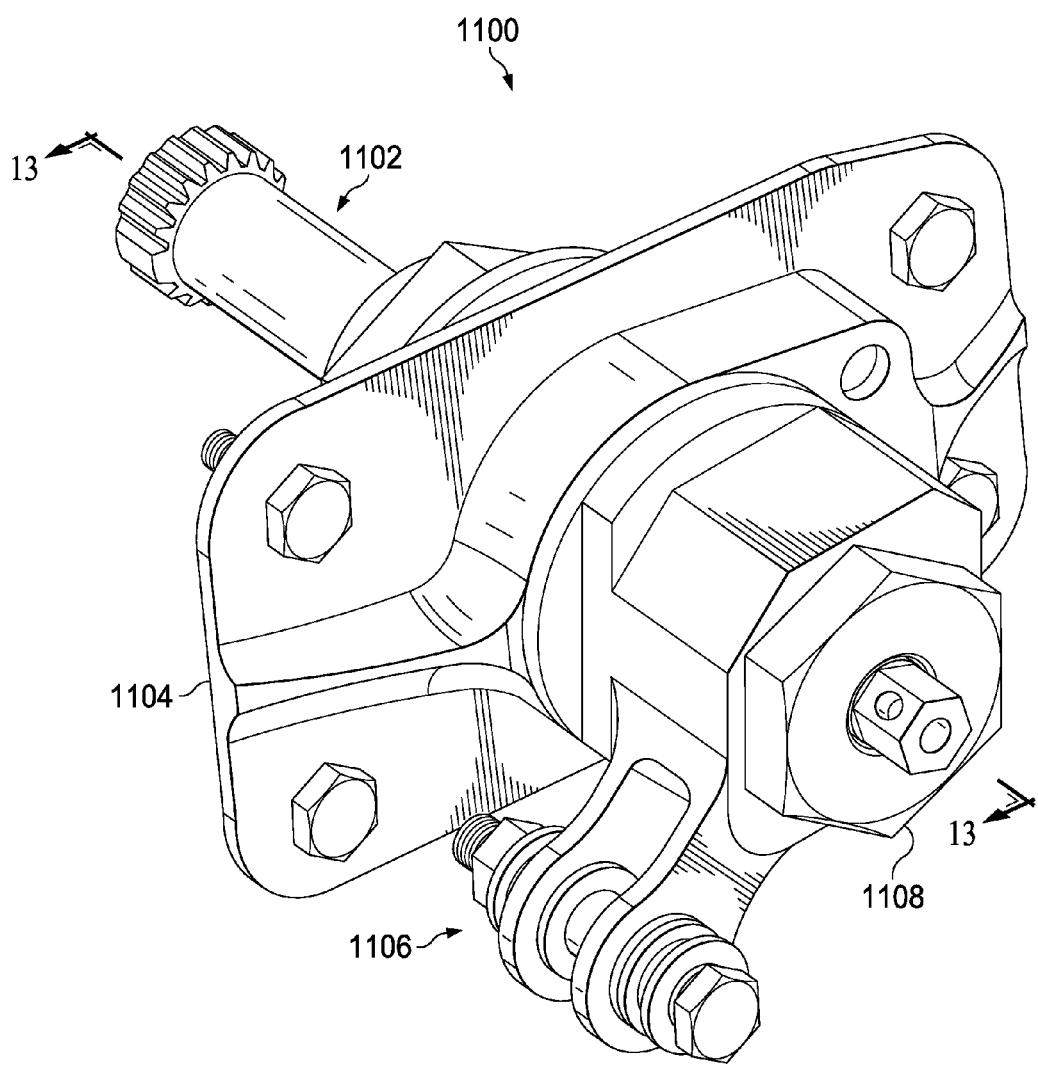
FIG. 11 is an illustration of an isometric side view of a secondary lock crank arm assembly in accordance with an illustrative embodiment.

Turning now to FIG. 11, an illustration of an isometric side view of a secondary lock crank arm assembly is depicted in accordance with an illustrative embodiment. Secondary lock crank arm assembly 1100 is an example of a component of folding wing system 400 of FIG. 4. Secondary lock crank arm assembly 1100 is an example of a component connecting one of number of latch pin actuators 500 of FIG. 5 to a secondary lock branch. Secondary lock crank arm assembly 1100 is a physical depiction of secondary lock crank arm assembly 368 of FIG. 3.

Secondary lock crank arm assembly 1100 may also be referred to as a quick disconnect crank arm assembly. Secondary lock crank arm assembly 1100 includes quill shaft 1102, housing 1104, crank arm 1106, and housing cap 1108. The design of quill shaft 1102 and housing cap 1108 enables quick removal of quill shaft 1102 from secondary lock crank arm assembly 1100. Housing cap 1108 is further configured to provide a removal path for the quill shaft 1102. Quick removal of quill shaft 1102 enables faster maintenance of a folding wing system. Further, quick removal of quill shaft 1102 enables review of secondary lock crank arm assembly 1100 with disassembly of an associated secondary lock branch or other secondary lock crank arm assemblies.

Secondary lock crank arm assembly 1100 connects to an associated secondary lock branch using crank arm 1106. Force is transferred through crank arm 1106 and quill shaft 1102 to an associated latch pin actuator.

Figure 12:
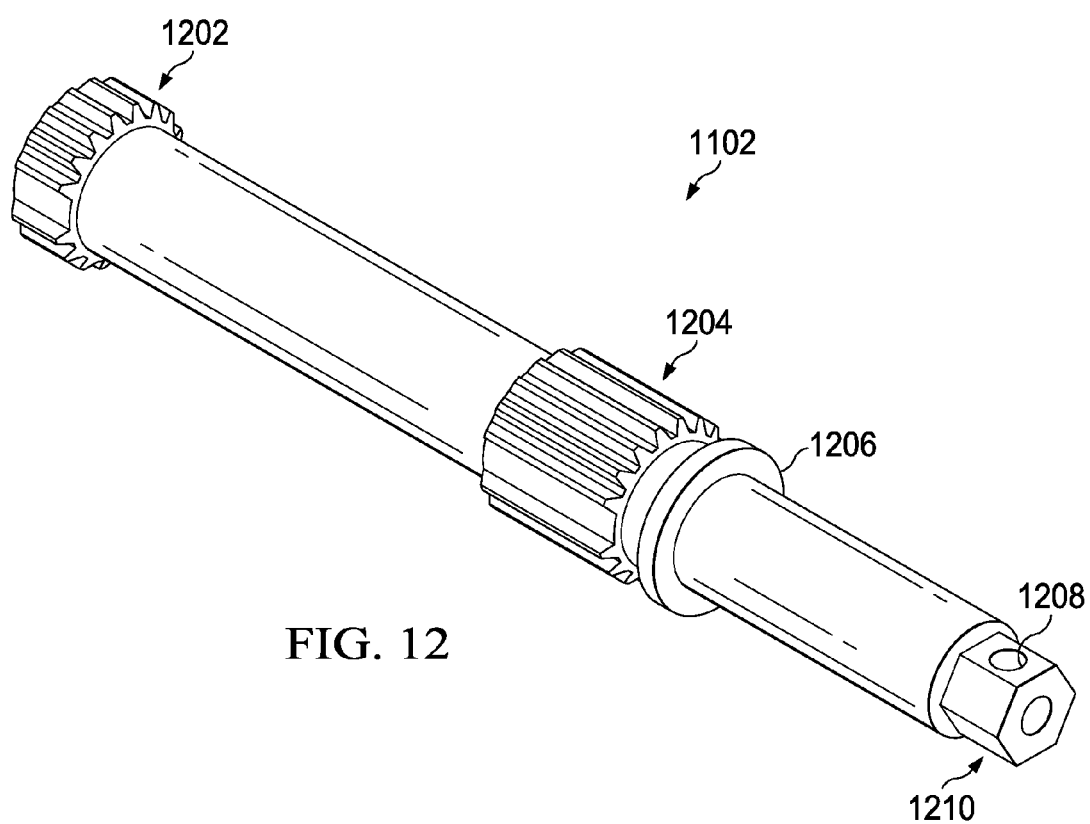
FIG. 12 is an illustration of an isometric side view of a quill shaft of a secondary lock crank arm assembly in accordance with an illustrative embodiment.

Turning now to FIG. 12, an illustration of an isometric side view of a quill shaft of a secondary lock crank arm assembly is depicted in accordance with an illustrative embodiment. View 1200 is a view of quill shaft 1102 of secondary lock crank arm assembly 1100 of FIG. 11.

Quill shaft 1102 may also be referred to as a quick disconnect quill shaft. Quill shaft 1102 includes latch pin actuator interface spline 1202, lock crank interface spline 1204, stop 1206, quick release mechanism 1208, and manual drive input 1210. Quick release mechanism 1208 may be an example of a quick release crank arm assembly, as described with respect to FIG. 3 and FIG. 4. Force travels from lock crank interface spline 1204 towards latch pin actuator interface spline 1202 to drive motion of a secondary lock of a lock actuator, such as secondary lock 364 of FIG. 3. Lock crank interface spline 1204 interfaces with a secondary lock branch, such as secondary lock branch 334 of FIG. 3.

Stop 1206 retains quill shaft 1102 within housing 1104 and housing cap 1108 of FIG. 11. Stop 1206 provides stopping force for quill shaft 1102 in both a retracted position and an extended position. Further, stop 1206 prevents over-compression of a spring within housing 1104 and housing cap 1108 of FIG. 11. Stop 1206 also provides an engagement surface for the spring.

Quick release mechanism 1208, as depicted, is a hole that provides an engagement area for any desirable shaft. The shaft may be a hex wrench, a screwdriver, or any other desirable type of shaft. The shaft may be any desirable tool commonly available to maintenance personnel. When a shaft is inserted into quick release mechanism 1208, quill shaft 1102 is pulled from an engaged or extended position to a disengaged or retracted position.

Manual drive input 1210 is used to provide manual input to a latch pin actuator. In some examples, manual force is applied during maintenance to determine if secondary lock crank arm assembly 1100 of FIG. 11 is functioning. In these examples, a wrench is used to provide manual force to manual drive input 1210.

Figure 13:
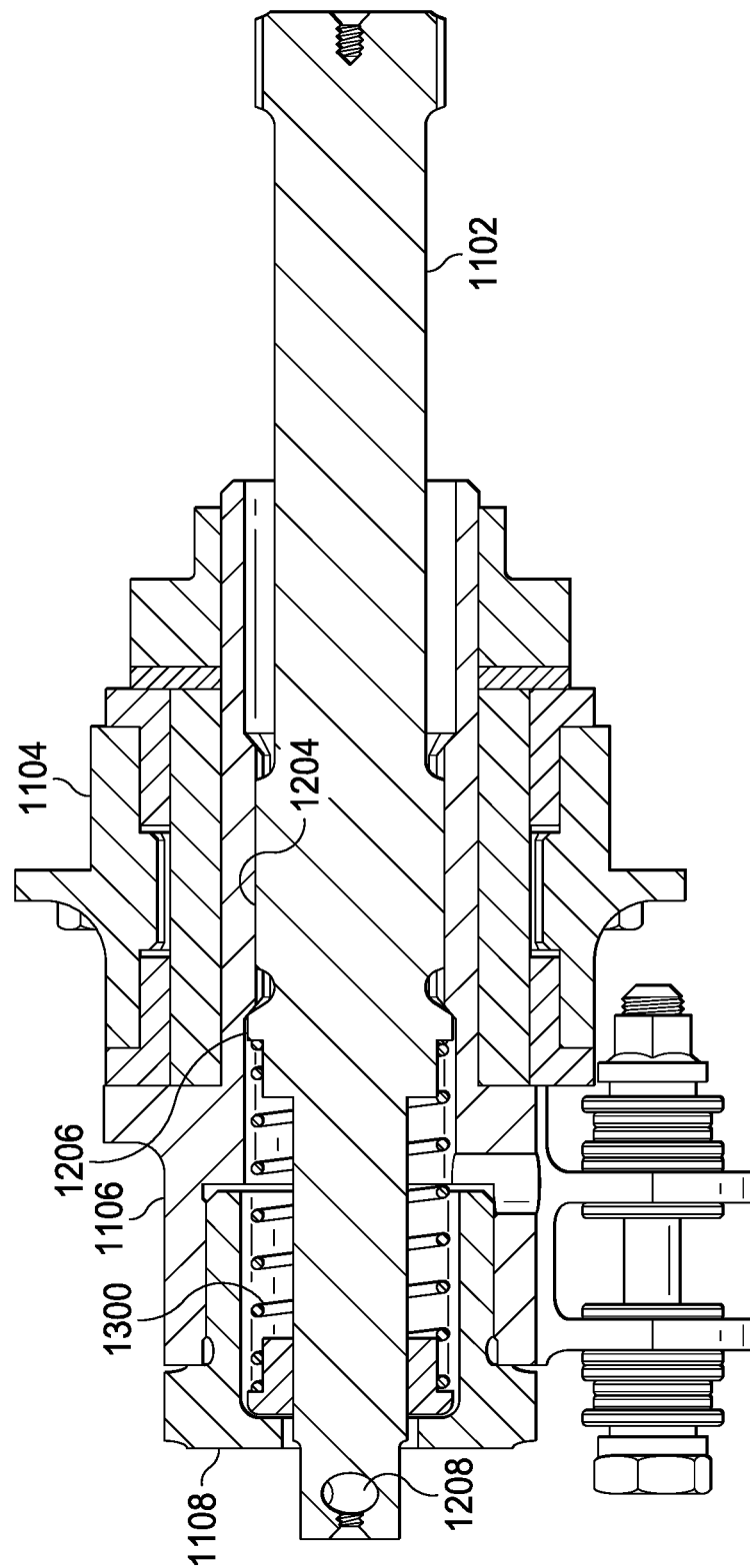
FIG. 13 is a cross-sectional view of a secondary lock crank arm assembly in accordance with an illustrative embodiment.

Turning now to FIG. 13, a cross-sectional view of a secondary lock crank arm assembly is depicted in accordance with an illustrative embodiment. Cross-sectional view 1300 is a view of secondary lock crank arm assembly 1100 along line 13 of FIG. 11.

As depicted, spring 1300 is positioned within secondary lock crank arm assembly 1100. Spring 1300 is used to load quill shaft 1102 towards a latch pin actuator. As depicted, quill shaft 1102 is extended to engage a latch pin actuator.

Further, as depicted, lock crank interface spline 1204 of quill shaft 1102 engages crank arm 1106. Spring 1300 biases lock crank interface spline 1204 to engage crank arm 1106.

Figure 14:
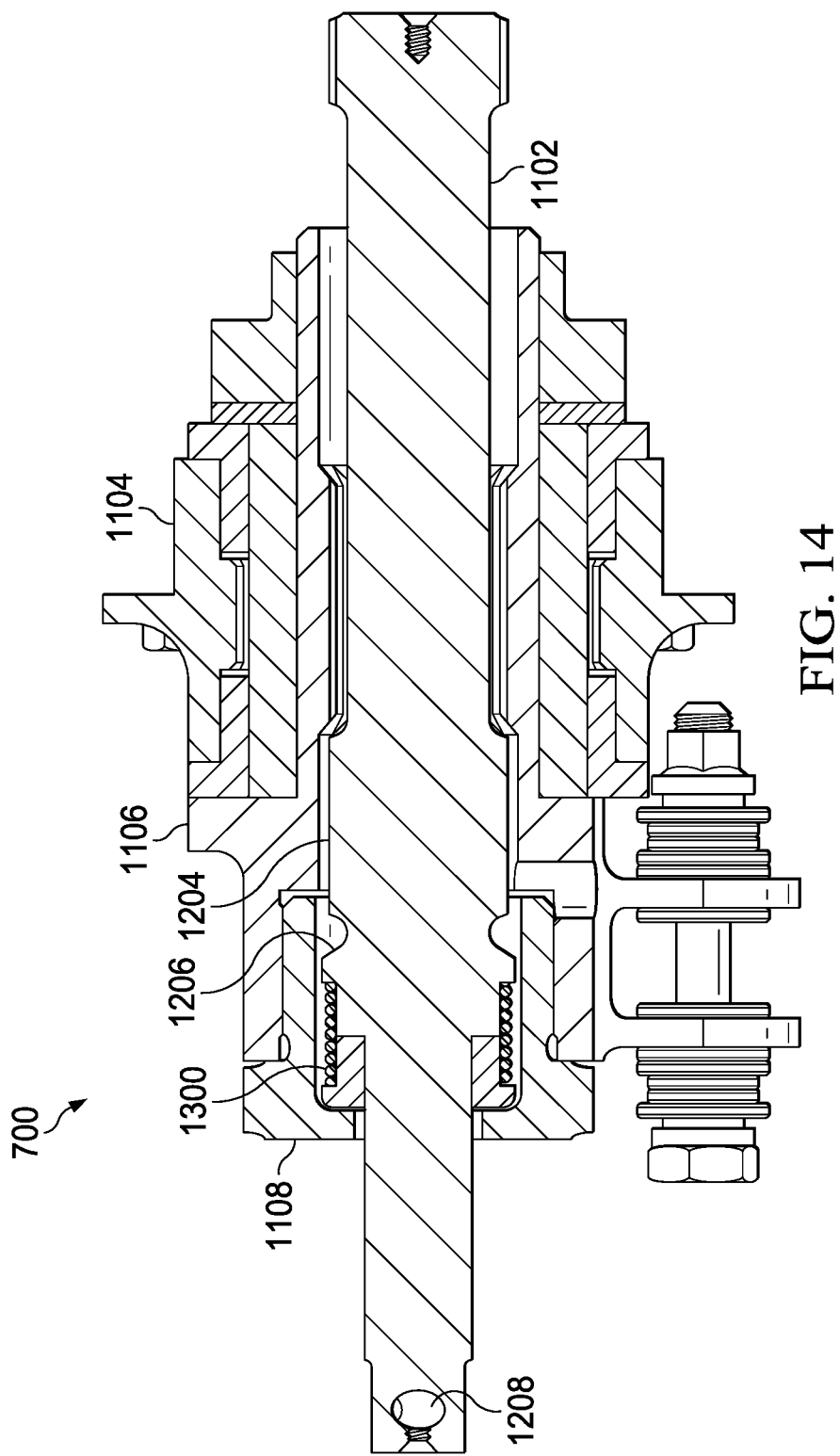
FIG. 14 is a cross-sectional view of a secondary lock crank arm assembly in accordance with an illustrative embodiment.

Turning now to FIG. 14, a cross-sectional view of a secondary lock crank arm assembly is depicted in accordance with an illustrative embodiment. Cross-sectional view 1400 is a view of secondary lock crank arm assembly 1100 along line 13 of FIG. 11.

As depicted, quill shaft 1102 is pulled against spring 1300. As depicted, quill shaft 1102 is disengaged from crank arm 1106. Further, as depicted, quill shaft 1102 is in a retracted position.

The illustrations of aircraft 100 in FIGS. 1-2, folding wing system 400 in FIG. 4, number of latch pin actuators 500 in FIG. 5, latch pin actuator 600 in FIGS. 6 and 7, diagram 800 of FIG. 8, and secondary lock crank arm assembly 1100 in FIGS. 11-14 are not meant to imply physical or architectural limitations to the manner in which an illustrative embodiment may be implemented. Other components in addition to or in place of the ones illustrated may be used. Some components may be unnecessary.

The different components shown in FIGS. 1-2 and 4-14 may be combined with components in FIG. 3, used with components in FIG. 3, or a combination of the two. Additionally, some of the components in FIGS. 1-2 and 4-14 may be illustrative examples of how components shown in block form in FIG. 3 may be implemented as physical structures.

Figure 15:
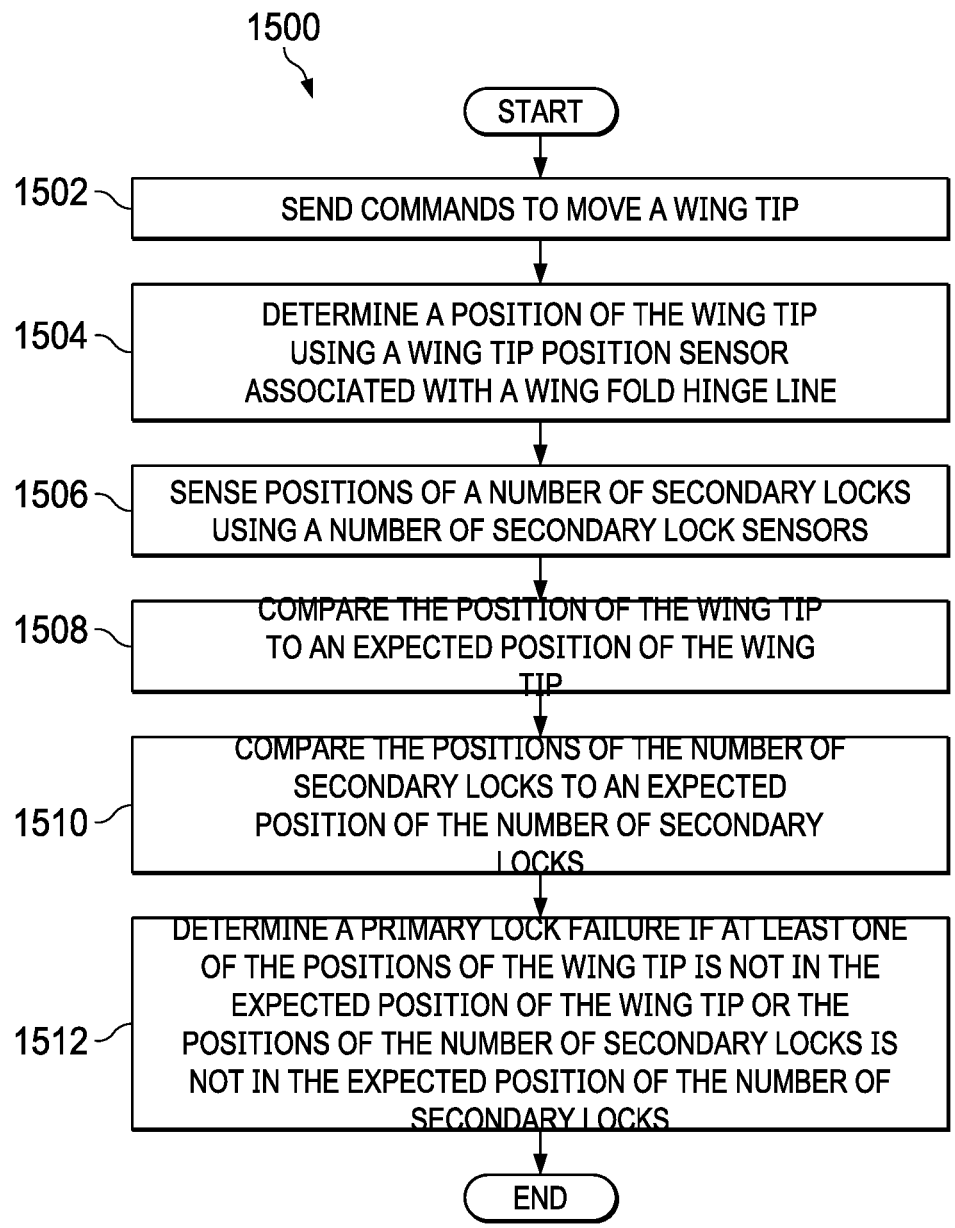
FIG. 15 is an illustration of a flowchart of a process for indirectly determining primary lock failure of any of a number of latch pin actuators in a folding wing system in accordance with an illustrative embodiment.

Turning now to FIG. 15, an illustration of a flowchart of a process for indirectly determining primary lock failure of any of a number of latch pin actuators in a folding wing system is depicted in accordance with an illustrative embodiment. Process 1500 sends commands to move a wing tip (operation 1502). Process 1500 determines a position of the wing tip using a wing tip position sensor associated with a wing fold hinge line (operation 1504).

Process 1500 senses positions of a number of secondary locks using a number of secondary lock sensors (operation 1506). In some illustrative examples, sensing the positions of the number of secondary locks using a number of secondary lock sensors comprises sensing the positions of the number of secondary locks using two secondary lock sensors positioned at opposite ends of a number of secondary lock linkages connected in series, wherein the number of secondary lock linkages drives the number of secondary locks.

Process 1500 compares the position of the wing tip to an expected position of the wing tip (operation 1508). Process 1500 compares the positions of the number of secondary locks to an expected position of the number of secondary locks (operation 1510). Process 1500 determines a primary lock failure if at least one of the position of the wing tip is not in the expected position of the wing tip or the positions of the number of secondary locks is not in the expected position of the number of secondary locks (operation 1512). Afterwards the process terminates.

In some illustrative examples, determining the primary lock failure comprises identifying a primary lock fracture of one of the number of latch pin actuators when the expected position of the wing tip is folded and the position of the wing tip is not folded. In other illustrative examples, determining the primary lock failure comprises identifying a primary lock in an unlocked position when the expected position of the number of secondary locks is a locked position and the position of at least one secondary lock is unlocked.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the Figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, process 1500 may further comprise removing a quick release quill from a secondary lock crank arm assembly to determine which of the number of latch pin actuators is not functioning. Removing the quick release quill is performed by removing a housing cap. In another example, process 1500 may further comprise disengaging a quick release quill from a secondary lock crank arm assembly to determine which of the number of latch pin actuators is not functioning. Disengaging a quick release quill includes applying counter pressure to a spring that biases the quick release quill to the engaged position. Applying counter pressure may be performed by pulling on the quick release quill using a shaft inserted into a quick release mechanism of the quill.

Although, process 1500 explicitly detects a primary lock failure, process 1500 may detect other types of failures. For example, process 1500 may detect secondary lock failures, unlock piston failures, latch pin jams, quill shaft or crank arm failures.

Turning now to FIG. 16, an illustration of a data processing system in the form of a block diagram is depicted in accordance with an illustrative embodiment. Data processing system 1600 may be used to implement processor 246 of FIG. 2. Data processing system 1600 may be used to process data, such as measurements, from sensor system 322 of FIG. 3 or sensor system 408 of FIG. 4. As depicted, data processing system 1600 includes communications framework 1602, which provides communications between processor unit 1604, storage devices 1606, communications unit 1608, input/output unit 1610, and display 1612. In some cases, communications framework 1602 may be implemented as a bus system.

Processor unit 1604 is configured to execute instructions for software to perform a number of operations. Processor unit 1604 may comprise a number of processors, a multi-processor core, and/or some other type of processor, depending on the implementation. In some cases, processor unit 1604 may take the form of a hardware unit, such as a circuit system, an application specific integrated circuit (ASIC), a programmable logic device, or some other suitable type of hardware unit.

Instructions for the operating system, applications, and/or programs run by processor unit 1604 may be located in storage devices 1606. Storage devices 1606 may be in communication with processor unit 1604 through communications framework 1602. As used herein, a storage device, also referred to as a computer readable storage device, is any piece of hardware capable of storing information on a temporary and/or permanent basis. This information may include, but is not limited to, data, program code, and/or other information.

Memory 1614 and persistent storage 1616 are examples of storage devices 1606. Memory 1614 may take the form of, for example, a random access memory or some type of volatile or non-volatile storage device. Persistent storage 1616 may comprise any number of components or devices. For example, persistent storage 1616 may comprise a hard drive, a flash memory, a rewritable optical disk, a rewritable magnetic tape, or some combination of the above. The media used by persistent storage 1616 may or may not be removable.

Communications unit 1608 allows data processing system 1600 to communicate with other data processing systems and/or devices. Communications unit 1608 may provide communications using physical and/or wireless communications links.

Input/output unit 1610 allows input to be received from and output to be sent to other devices connected to data processing system 1600. For example, input/output unit 1610 may allow user input to be received through a keyboard, a mouse, and/or some other type of input device. As another example, input/output unit 1610 may allow output to be sent to a printer connected to data processing system 1600.

Display 1612 is configured to display information to a user. Display 1612 may comprise, for example, without limitation, a monitor, a touch screen, a laser display, a holographic display, a virtual display device, and/or some other type of display device.

In this illustrative example, the processes of the different illustrative embodiments may be performed by processor unit 1604 using computer-implemented instructions. These instructions may be referred to as program code, computer usable program code, or computer readable program code, and may be read and executed by one or more processors in processor unit 1604.

In these examples, program code 1618 is located in a functional form on computer readable media 1620, which is selectively removable, and may be loaded onto or transferred to data processing system 1600 for execution by processor unit 1604. Program code 1618 and computer readable media 1620 together form computer program product 1622. In this illustrative example, computer readable media 1620 may be computer readable storage media 1624 or computer readable signal media 1626.

Computer readable storage media 1624 is a physical or tangible storage device used to store program code 1618 rather than a medium that propagates or transmits program code 1618. Computer readable storage media 1624 may be, for example, without limitation, an optical or magnetic disk or a persistent storage device that is connected to data processing system 1600.

Alternatively, program code 1618 may be transferred to data processing system 1600 using computer readable signal media 1626. Computer readable signal media 1626 may be, for example, a propagated data signal containing program code 1618. This data signal may be an electromagnetic signal, an optical signal, and/or some other type of signal that can be transmitted over physical and/or wireless communications links.

The illustration of data processing system 1600 in FIG. 16 is not meant to provide architectural limitations to the manner in which the illustrative embodiments may be implemented. The different illustrative embodiments may be implemented in a data processing system that includes components in addition to or in place of those illustrated for data processing system 1600. Further, components shown in FIG. 16 may be varied from the illustrative examples shown.

Figure 17:
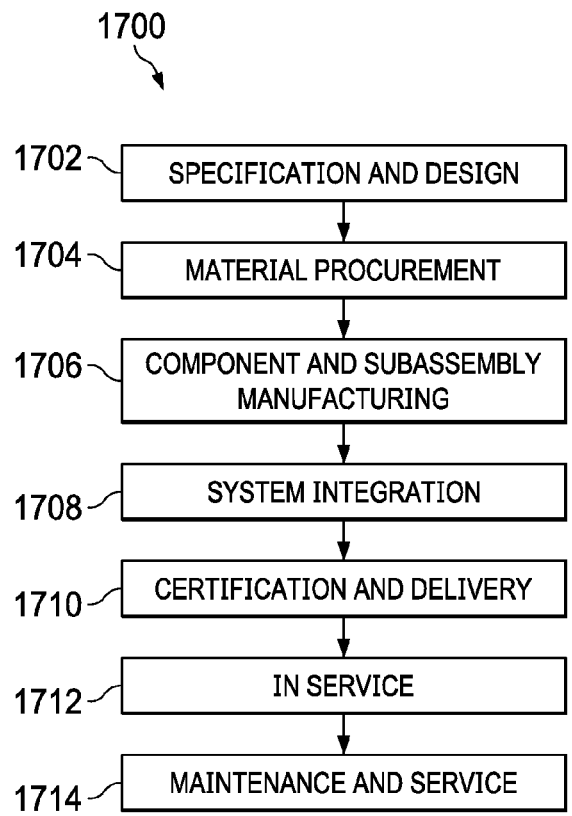
FIG. 17 is an illustration of a block diagram of an aircraft manufacturing and service method in accordance with an illustrative embodiment.
Figure 18:
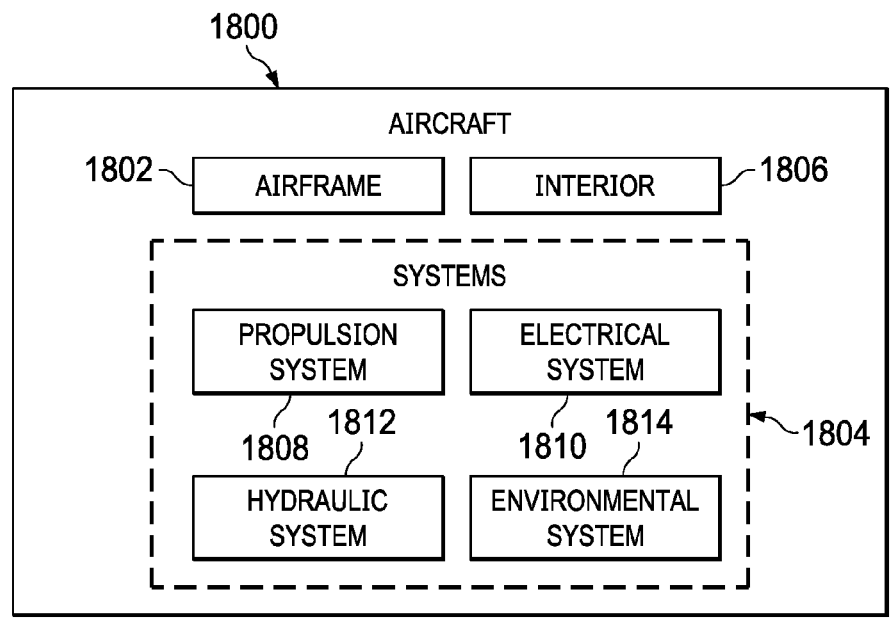
FIG. 18 is an illustration of a block diagram of an aircraft in which an illustrative embodiment may be implemented.

The illustrative embodiments of the disclosure may be described in the context of aircraft manufacturing and service method 1700 as shown in FIG. 17 and aircraft 1800 as shown in FIG. 18. Turning first to FIG. 17, an illustration of a block diagram of an aircraft manufacturing and service method is depicted in accordance with an illustrative embodiment. During pre-production, aircraft manufacturing and service method 1700 may include specification and design 1702 of aircraft 1800 of FIG. 18 and material procurement 1704.

During production, component and subassembly manufacturing 1706 and system integration 1708 of aircraft 1800 takes place. Thereafter, aircraft 1800 may go through certification and delivery 1710 in order to be placed in service 1712. While in service 1712 by a customer, aircraft 1800 is scheduled for routine maintenance and service 1716, which may include modification, reconfiguration, refurbishment, and other maintenance or service.

Each of the processes of aircraft manufacturing and service method 1700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of a block diagram of an aircraft is depicted in which an illustrative embodiment may be implemented. In this example, aircraft 1800 is produced by aircraft manufacturing and service method 1700 of FIG. 17 and may include airframe 1802 with plurality of systems 1804 and interior 1806. Examples of systems 1804 include one or more of propulsion system 1808, electrical system 1810, hydraulic system 1812, and environmental system 1816. Any number of other systems may be included. Although an aerospace example is shown, different illustrative embodiments may be applied to other industries, such as the automotive industry. The apparatuses and methods embodied herein may be employed during at least one of the stages of aircraft manufacturing and service method 1700 of FIG. 17.

One or more illustrative embodiments may be used during component and subassembly manufacturing 1706. For example, folding wing system 318 of FIG. 3 is installed during component and subassembly manufacturing 1706 of FIG. 17. Further, number of secondary lock crank arm assemblies 342 of FIG. 3 is used to determine which of number of latch pin actuators 320 of FIG. 3 are not functioning during maintenance and service 1712. A quick release quill in secondary lock crank arm assembly 1100 of FIG. 11 may be used during maintenance and service 1716 to reduce maintenance time.

The illustrative embodiments provide an apparatus and method for a folding wing system. Previous latch and lock systems used an in-line method of driving the secondary locks. The illustrative examples use a branched driveline which creates latent failure modes that were previously not detectible. The swing link design of the secondary lock branch enables operation in a thin wing structure (without any fairing).

The latch pin system operates in parallel to the hinge line in a thin wing while allowing for the detection of failures. The latch pin secondary lock operates using a swing link that extends from the actuator manifold installed near the forward spar. The latch pin primary lock is forced closed and locked when the unlock pressure is removed. The primary and secondary are integrated with interlocking cams.

The configuration uses a branched driveline for the secondary locks which adds potentially undetected failures to the secondary locks. The latch pin actuator arrangement ensures that failures of the primary locks are detected by either the secondary lock position sensors or by prevention of normal operation of the overall system which is detected by the wing tip position sensors. Additionally, the quick disconnect quill shafts allow faster fault isolation during maintenance. The quick disconnect operation allows manual disengagement. Faster maintenance times are important to commercial airlines to prevent unnecessary downtime.

The description of the different illustrative embodiments has been presented for purposes of illustration and description, and may be not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A latch pin actuator comprising:
   a primary lock attached to a primary lock cam, the primary lock comprising a fracture evident geometry configured to divide the primary lock into sides connected at the fracture evident geometry;

a spring connected to a first side of the primary lock and biased to lock the primary lock; and
a piston connected to a second side of the primary lock and configured to unlock the primary lock.

2. The latch pin actuator of claim 1 further comprising:
a first independent pin connecting the piston to the primary lock on the first side of the fracture evident geometry of the primary lock; and
a second independent pin connecting the spring to the primary lock on the second side of the fracture evident geometry of the primary lock.

3. The latch pin actuator of claim 1, wherein the fracture evident geometry comprises a notch configured to fracture under a designated force or abnormal wear.

4. The latch pin actuator of claim 1 further comprising:
a secondary lock;
a spring biased to lock the secondary lock; and
a secondary lock crank arm assembly connected to the secondary lock.

5. The latch pin actuator of claim 4, wherein the secondary lock crank arm assembly comprises a quick release crank arm assembly.

6. The latch pin actuator of claim 1, further comprising the spring configured to bias the first side of the primary lock to a position that, responsive to a fracture of the primary lock, prohibits a movement of an associated latch pin to an unlocked position.

7. A folding wing system comprising:
a number of latch pin actuators each comprising a length of a latch pin being parallel to a wing fold hinge line of the folding wing system; and
a sensor system configured to indirectly detect failure of a primary lock of any of the number of latch pin actuators.

8. The folding wing system of claim 7, wherein the sensor system comprises four sensors.

9. The folding wing system of claim 8, wherein the sensor system comprises a wing tip position sensor associated with the wing fold hinge line.

10. The folding wing system of claim 9, wherein the sensor system further comprises an angle gearbox position sensor attached to an angle gearbox and associated with the wing fold hinge line.

11. The folding wing system of claim 10, further comprising at least one of: the wing tip position sensor or the angle gearbox position sensor, configured to, responsive to a command to fold a wing tip, indirectly detect a primary lock fracture of one of the number of latch pin actuators.

12. The folding wing system of claim 8, wherein the sensor system comprises a secondary lock drive line position sensor connected to a first end of a secondary lock branch.

13. The folding wing system of claim 12, further comprising the secondary lock drive line position sensor configured to indirectly detect a jam of a primary lock of one of the number of latch pin actuators.

14. The folding wing system of claim 7, wherein the sensor system comprises a secondary lock actuator sensor connected to a secondary lock actuator.

15. The folding wing system of claim 14, further comprising the secondary lock actuator sensor configured to indirectly detect a jam of a primary lock of one of the number of latch pin actuators.

16. A method of indirectly determining a failure of a primary lock in any of a number of latch pin actuators in a folding wing system, the method comprising:
receiving commands, in the folding wing system, to move a wing tip;
determining, using a wing tip position sensor associated with a wing fold hinge line, a position of the wing tip;
sensing, using a number of secondary lock sensors, positions of a number of secondary locks; and
comparing, in a processor, the position of the wing tip to an expected position of the wing tip;
comparing, in the processor, the positions of the number of secondary locks to an expected position of the number of secondary locks; and
determining, in the processor, responsive to at least one of: the wing tip position sensor not sensing the position of the wing tip in the expected position of the wing tip, or any secondary lock sensor in the number of secondary lock sensors not sensing the positions of any of the number of secondary locks in the expected position of the number of secondary locks, a failure of any primary lock in any of the number of latch pin actuators.

17. The method of claim 16, wherein determining the failure of the primary lock comprises:
identifying, responsive to expecting the position of the wing tip to be folded and sensing the position of the wing tip as not being folded, a fracture in a primary lock of one of the number of latch pin actuators.

18. The method of claim 16, wherein determining the failure of the primary lock comprises:
expecting a position of the number of secondary locks to be a locked position and identifying a primary lock in an unlocked position and a position of at least one secondary lock in an unlocked position.

19. The method of claim 16, further comprising:
sensing the positions of the number of secondary locks via two secondary lock sensors positioned at opposite ends of a number of secondary lock linkages connected in series, the number of secondary lock linkages configured for driving the number of secondary locks.

20. A secondary lock crank arm assembly that comprises:
a quill shaft that comprises a quick release mechanism configured to provide a quick release from a latch pin actuator;
a crank arm configured to interface with the quill shaft; and
a spring configured to bias the quill shaft into an engaged position with the latch pin actuator.

21. The secondary lock crank arm assembly of claim 20 further comprising:
a housing cap configured to retain the spring within a housing of the secondary lock crank arm assembly.

22. The secondary lock crank arm assembly of claim 21, wherein the housing cap is further configured to provide a removal path for the quill shaft.

23. The secondary lock crank arm assembly of claim 20, wherein the quick release mechanism comprises a hole through a first end of the quill shaft.

24. The secondary lock crank arm assembly of claim 20, wherein the quill shaft further comprises a lock crank interface spline configured to engage the crank arm and a latch pin actuator interface spline.

25. The secondary lock crank arm assembly of claim 24, further comprising the quick release mechanism configured to place the lock crank interface spline of the quill shaft into a disengaged position.

26. The secondary lock crank arm assembly of claim 20, further comprising the quick release mechanism configured to provide counter pressure to the spring.

27. A folding wing system comprising:
- a number of latch pin actuators configured such that each of the number of latch pin actuators respectively comprise a latch pin parallel to a wing fold hinge line of the folding wing system;
- a number of secondary lock linkages connected in series such that a length of the series lies parallel to the wing fold hinge line of the folding wing system; and
- the number of latch pin actuators connected to the number of secondary lock linkages via a number of secondary lock crank arm assemblies.

28. The folding wing system of claim 27, wherein the number of secondary lock crank arm assemblies comprise a number of quick release crank arm assemblies.

29. The folding wing system of claim 27 further comprising:
- two secondary lock sensors directly connected to the number of secondary lock linkages connected in series.

30. The folding wing system of claim 29, wherein the two secondary lock sensors comprise a secondary lock driveline position sensor at a first end of the series and a secondary lock actuator sensor at a second end of the series.

31. The folding wing system of claim 27, wherein the number of secondary lock linkages comprises at least one of: a single solid rod, a swing link with lost motion, or cables and pulleys.

* * * * *